United States Patent [19]
Casey et al.

[11] Patent Number: 5,371,848
[45] Date of Patent: Dec. 6, 1994

[54] METHOD FOR OPERATING AND DISPLAYING STATUS OF A COMPUTER SYSTEM

[75] Inventors: Bernice E. Casey, Woodstock; Gregory L. Dunlap, Poughkeepsie; Sammy L. Rockwell, Owego, all of N.Y.

[73] Assignee: International Business Machines Corporation, Armonk, N.Y.

[21] Appl. No.: 52,231

[22] Filed: Apr. 22, 1993

Related U.S. Application Data

[63] Continuation of Ser. No. 577,969, Sep. 4, 1990, abandoned.

[51] Int. Cl.⁵ ............................................. G06F 15/62
[52] U.S. Cl. ..................................... 395/161; 395/700
[58] Field of Search ........................... 395/155–161, 395/200, 575, 700, 112–116, 152–154, 162–163, 325, 375, 750, 166; 434/322; 340/723; 364/286.3, 281.6

[56] References Cited

U.S. PATENT DOCUMENTS

| | | | |
|---|---|---|---|
| 4,396,977 | 8/1983 | Slater et al. | 364/188 |
| 4,511,964 | 4/1985 | Georg et al. | 395/400 |
| 4,628,444 | 12/1986 | Nozawa et al. | 364/188 |
| 4,635,195 | 1/1987 | Jeppesen, III et al. | 395/750 |
| 4,695,946 | 9/1987 | Andreasen et al. | 395/575 |
| 4,700,290 | 10/1987 | Ichikawa | 364/167.01 |
| 4,747,041 | 5/1988 | Engel et al. | 395/750 |
| 4,752,889 | 6/1988 | Rappaport et al. | 364/513 |
| 4,772,882 | 9/1988 | Mical | 395/156 X |
| 4,809,163 | 2/1989 | Hirosawa | 395/750 |
| 4,833,592 | 5/1989 | Yamanaka | 395/161 X |
| 4,835,700 | 5/1989 | Tanaka et al. | 364/474.23 |
| 4,843,541 | 6/1989 | Bean et al. | 364/281.6 |
| 4,858,152 | 8/1989 | Estes | 364/550 |
| 4,866,638 | 9/1989 | Cosentino et al. | 364/521 |
| 4,885,704 | 12/1989 | Takagi et al. | 364/521 |

(List continued on next page.)

FOREIGN PATENT DOCUMENTS 0115348 8/1988 European Pat. Off. .
60-005366 5/1985 Japan .

OTHER PUBLICATIONS

Brown, "Alloy Computer Products Inc. Alloy Retriever /60", PC Mag., Dec. 26, 1989, p. 196 (1).
Computergram Int., "IBM Decision Support", May 23, 1989.

(List continued on next page.)

*Primary Examiner*—Heather R. Herndon
*Assistant Examiner*—John E. Breene
*Attorney, Agent, or Firm*—Arthur J. Samodovitz

[57] ABSTRACT

A support computer controls operation of a data processing computer, the support computer includes: a video display monitor, an input device for making selections from video display monitor, and a processor. A first program runs on the processor for displaying a display screen on the monitor. The display screen includes an identification of the data processing computer or a component thereof, a status field, and a plurality of action selection categories including an action selection category used to operate the data processing computer. The first program is responsive to a selection of the action selection category to operate the data processing computer, for displaying a pull down of action functions within the action selection category. A second program runs on the processor and reads a selection made via the input device from the action selection category to activate the data processing computer and generates an activate signal. An activation program runs on the processor and directs activation of the data processing computer in response to receipt of the activate signal. A third program runs on the processor for updating the status of the data processing computer after the data processing computer is activated.

15 Claims, 25 Drawing Sheets

U.S. PATENT DOCUMENTS

| | | | |
|---|---|---|---|
| 4,896,291 | 1/1990 | Gest et al. | 364/900 |
| 4,926,349 | 5/1990 | Thor | 395/156 |
| 4,958,278 | 9/1990 | Meguro | 395/275 |
| 4,974,173 | 11/1990 | Stefik et al. | 395/157 X |
| 5,002,491 | 5/1991 | Abrahamson | 434/322 |
| 5,021,949 | 6/1991 | Morten et al. | 395/200 |
| 5,049,873 | 9/1991 | Robins et al. | 395/161 X |
| 5,050,104 | 9/1991 | Heyen et al. | 395/159 X |
| 5,113,517 | 5/1992 | Beard et al. | 364/286.3 |
| 5,113,522 | 5/1992 | Dinwiddie, Jr. et al. | 395/700 |
| 5,157,765 | 10/1992 | Birk et al. | 395/160 X |
| 5,226,120 | 7/1993 | Brown et al. | 395/161 X |
| 5,233,688 | 8/1993 | Too | 395/161 |
| 5,261,044 | 11/1993 | Dev et al. | 395/159 |
| 5,276,789 | 1/1994 | Besaw et al. | 395/161 X |

OTHER PUBLICATIONS

Computergram Int., "IBM Announcements", Apr. 21, 1989.

Gibson, "From three Mainframes to one with PR/SM", Computerworld, Aug. 21, 1989, p. 29(1).

Ray, "DUS", PC Week, Mar. 20, 1989, p. 81(1).

Miles, "The Colonel Picks OS-2 Network for its U.S. Fried Chicken Outlets", OC Week, Jun. 12, 1989, p. 1(2).

"OS/2 Office, Using OS/2 Office", IBM Document, Apr. 1990.

"IBM 4381 Operations and Recovery Gide", IBM Doc., May 1988, pp. 18–45.

IBM Tech. Disclosure Bulletin, vol. 31, No. 11, Apr. 1989, New York, pp. 123–125, "IPL Status Via Non-Standard Display Method".

IBM Systems Journal, vol. 29, No. 1, 1990, Armonk, N.Y., pp. 44–58, "Effective Application Development for Presentation Manager Programs".

"Systems Application Architecture Common User Access Advanced Interface Design Guide" IBM Doc., Jun. 1989.

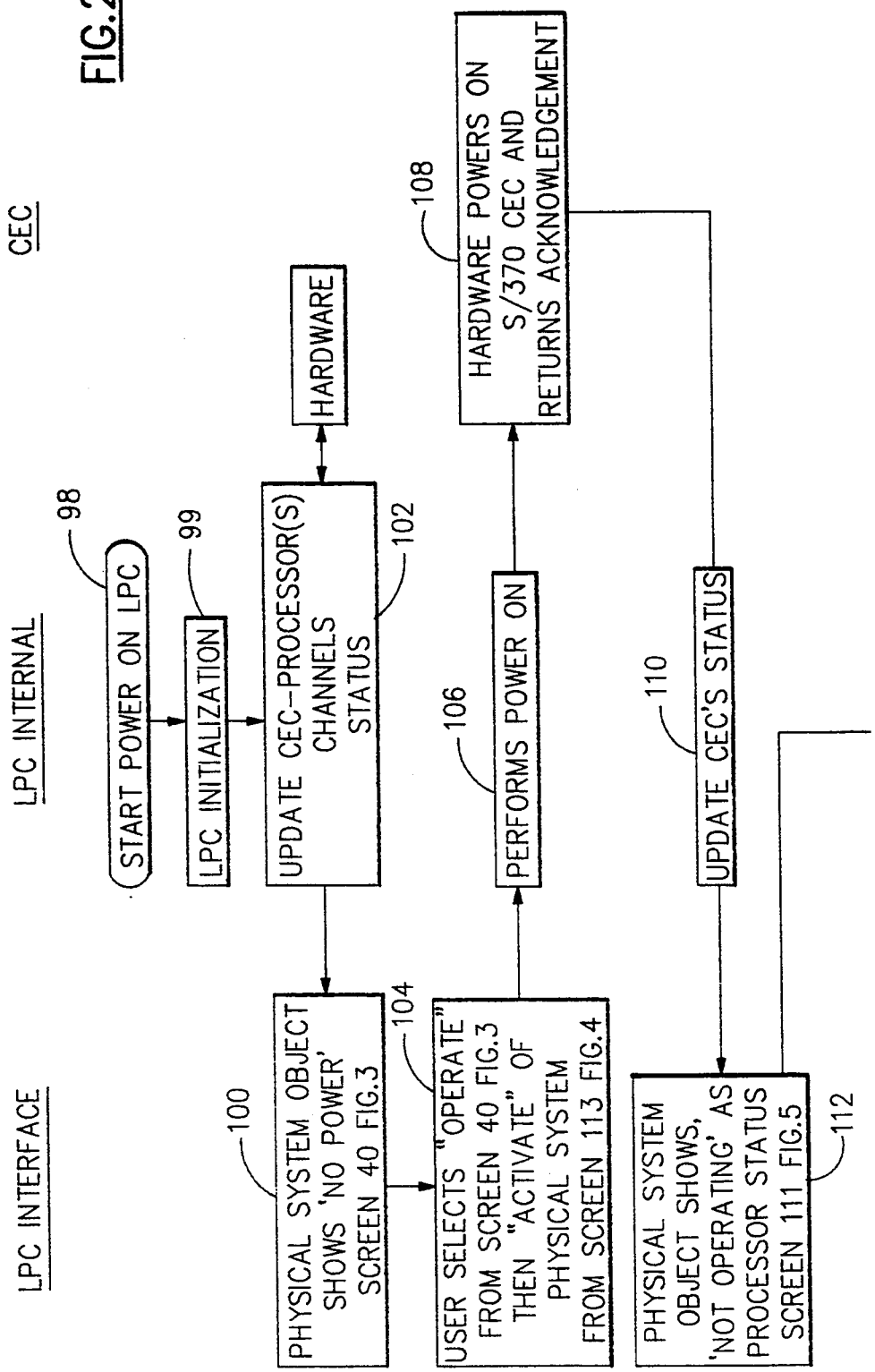

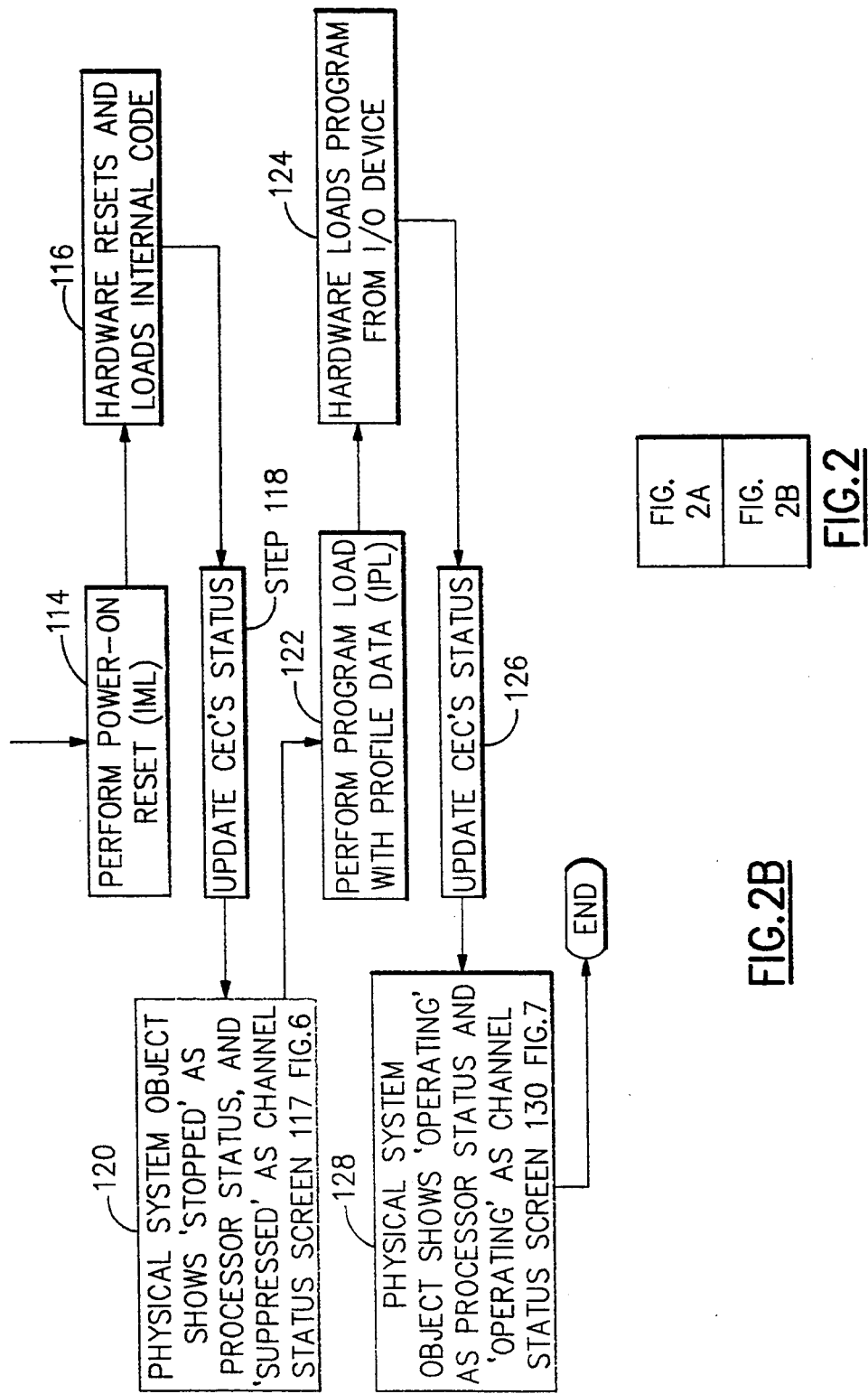

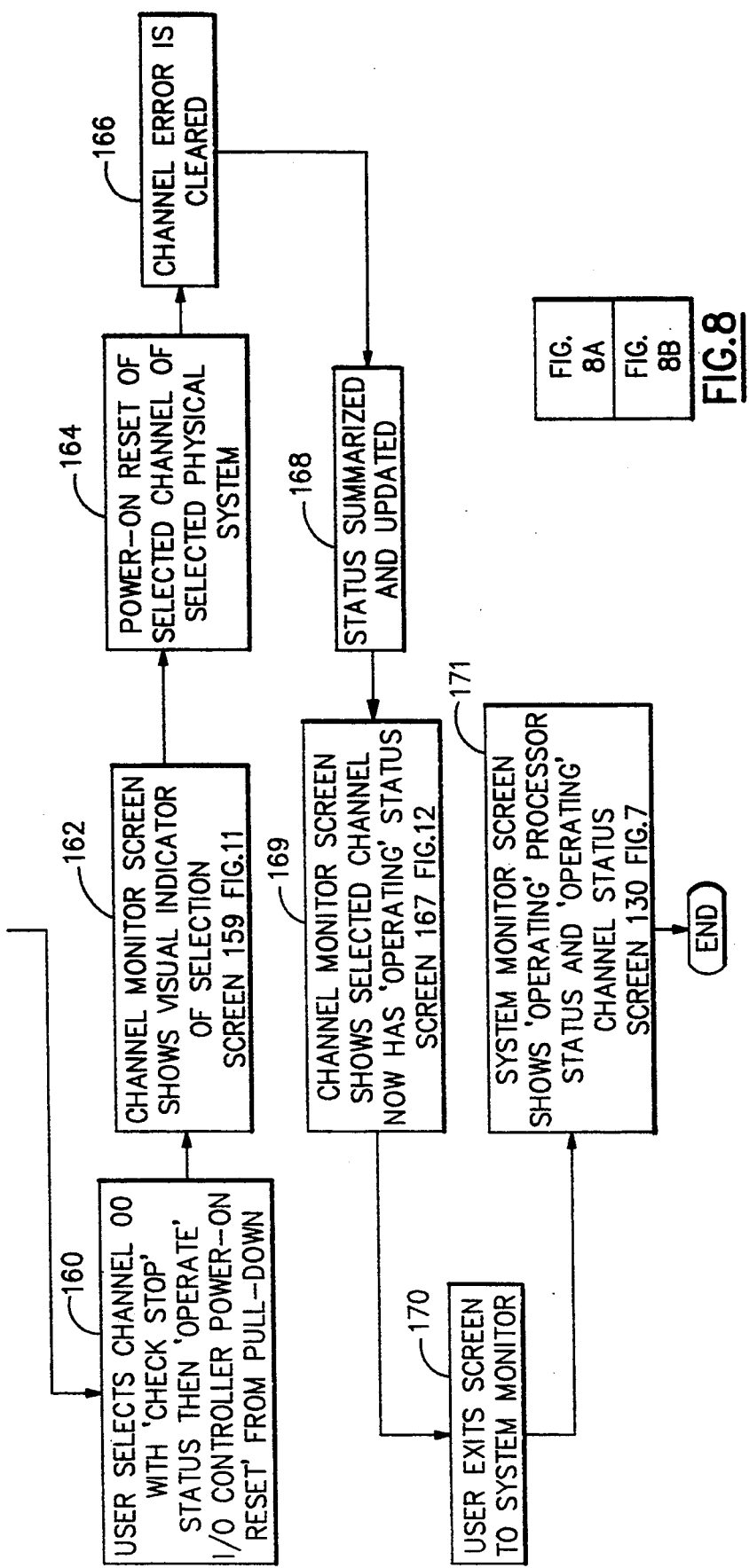

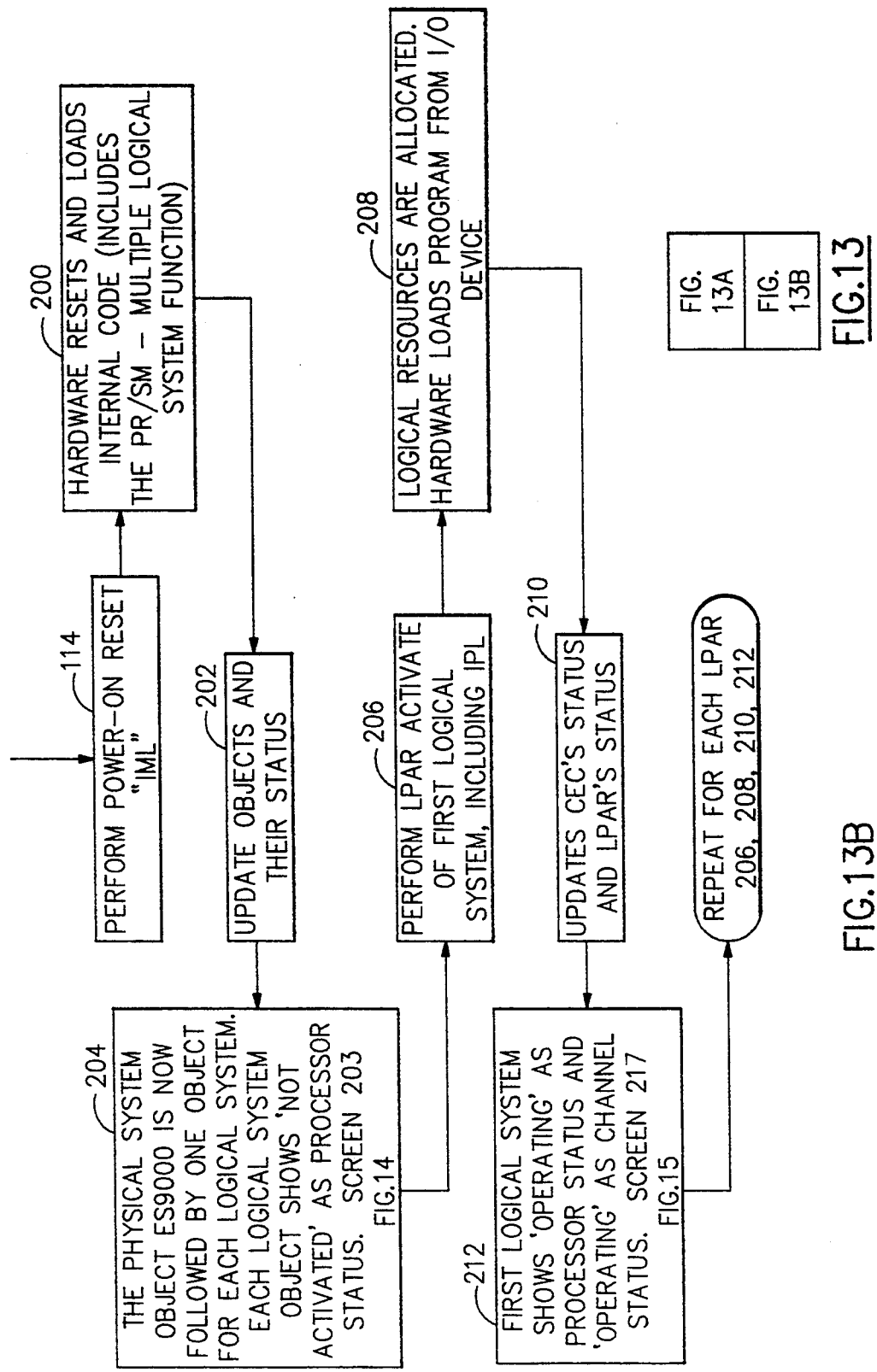

| FIG. 18A | FIG. 18B |

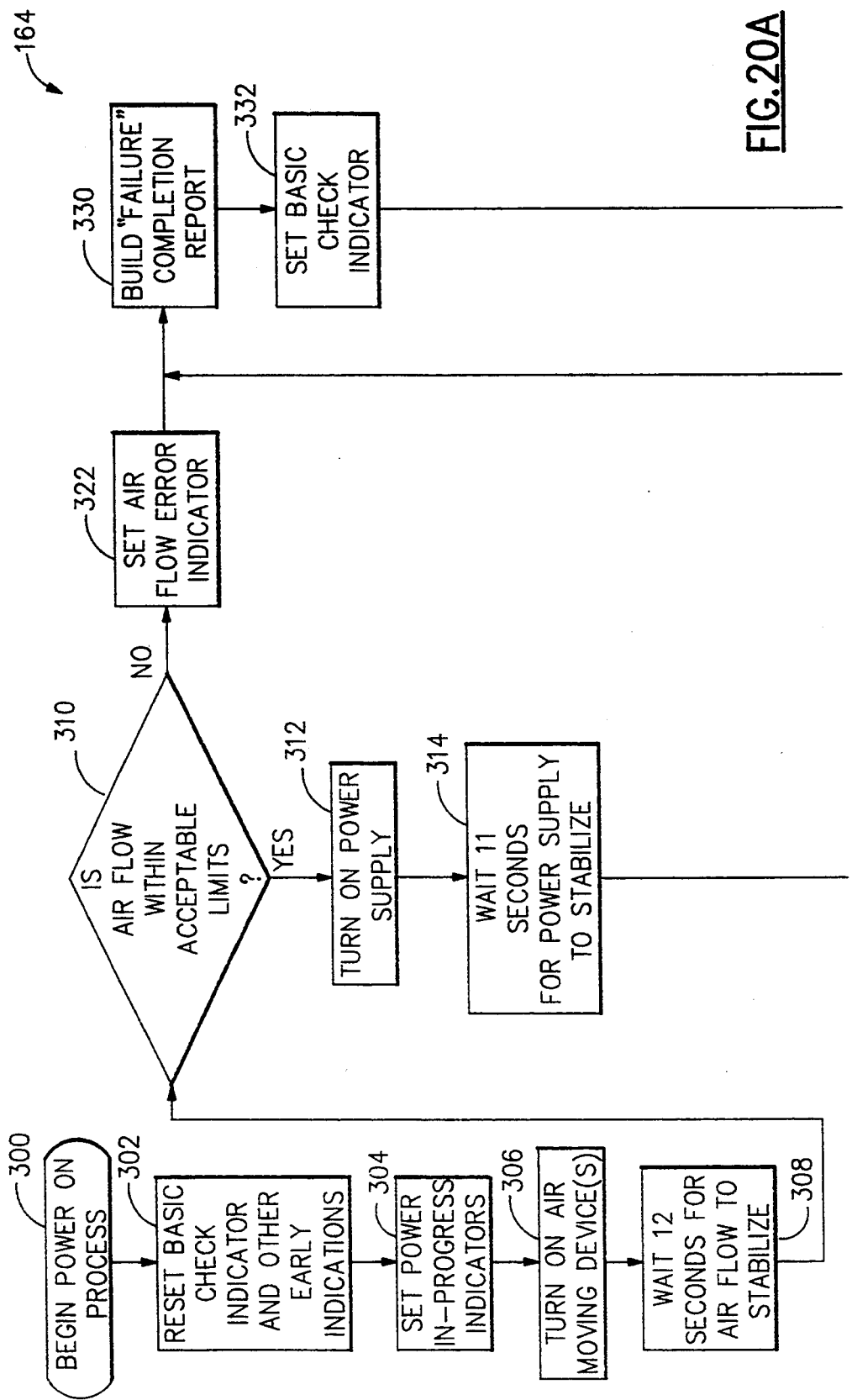

METHOD FOR OPERATING AND DISPLAYING STATUS OF A COMPUTER SYSTEM

The application is a continuation of application Ser. No. 07/577,969, filed Sep. 4, 1990, now abandoned.

The invention relates generally to computer systems, and deals more particularly with a user interface for operating a computer.

Heretofore, menu screens and a keyboard on a local processor console have been used as a user interface for operating an associated computer such as an IBM System/370 computer and an IBM 3090 computer. The user interface causes such operations as Power On, Initial Microprogram Load, and Initial Program Load to activate the computer. Once activated, the computer can run its own programs independent of this interface. For purposes of the interface, the computer is divided into a collection of real objects or targets including the processor(s), channels, memory, etc. and can be arranged by the user into logical partitions or combinations of logical elements. The menu screens and keyboard are used to select an operation to be performed on the object. In a single processor or multiprocessor environment, user errors have occurred with this interface when a user, unaware of the object that was previously selected, attempts to perform an action intended for a different object. In a multiprocessor environment, errors have also occurred when the user forgets to change to a new processor object with the menu screens when selecting an action intended for the new object.

These prior art systems also display the status of real objects such as a statement that a particular processor is operating.

A PR/SM (tm) or Physical Resource/System Management (tm) program (sold by IBM on 3090 Computer Models) has also been used to define the logical partitions or combinations of real objects residing in a computer system. The logical partitions (or LPARs) define the components of a logical computer system and indicate the number of processors, number of channels, amount of memory, etc. allocated to each LPAR. Then, when the logical computer system is activated, specific objects are assigned to each job according to the numbers and amounts of resources allocated by the logical partition.

A general object of the present invention is to provide a more user friendly interface for a computer than the prior art described above.

Another object of the present invention is to provide user interface which accommodates real and logical computer systems.

SUMMARY OF THE INVENTION

The invention resides in a support computer for controlling operation of a data processing computer, the support computer comprises: a video display monitor, an input device for making selections from video display monitor, and a processor. A first program runs on the processor for displaying a display screen on the monitor. The display screen comprises an identification of the data processing computer or a component thereof, a status field, and a plurality of action selection categories including an action selection category used to operate the data processing computer. The first program is responsive to a selection of the action selection category to operate the data processing computer, for displaying a pull down of action functions within the action selection category.

A second program runs on the processor and reads a selection made via the input device from the action selection category to activate the data processing computer and generates an activate signal. An activation program runs on the processor and directs activation of the data processing computer in response to receipt of the activate signal. A third program runs on the processor for updating the status of the data processing computer after the data processing computer is activated.

According to one feature of the invention, the display screen displays an identification of at least one logical partition of components within the data processing computer in addition to the identification of the data processing computer simultaneously. The second program is responsive to the action function selection from the pull down and a selection of the logical partition to generate an activate signal for the logical partition, the action function selection is the same as used to activate the data processing computer. The activate program directs activation of the logical partition in response to the activate signal for the logical partition.

BRIEF DESCRIPTION OF THE FIGURES

FIG. 2 is a flow diagram illustrating operation of the computer system of FIG. 1 while activating a central electronic complex of FIG. 1.

FIGS. 3-5 (in addition) and 14-15 are display screens which are displayed on the local processor console during the operation illustrated by FIG. 13.

DETAILED DESCRIPTION OF THE PREFERRED EMBODIMENTS

Figure 1:
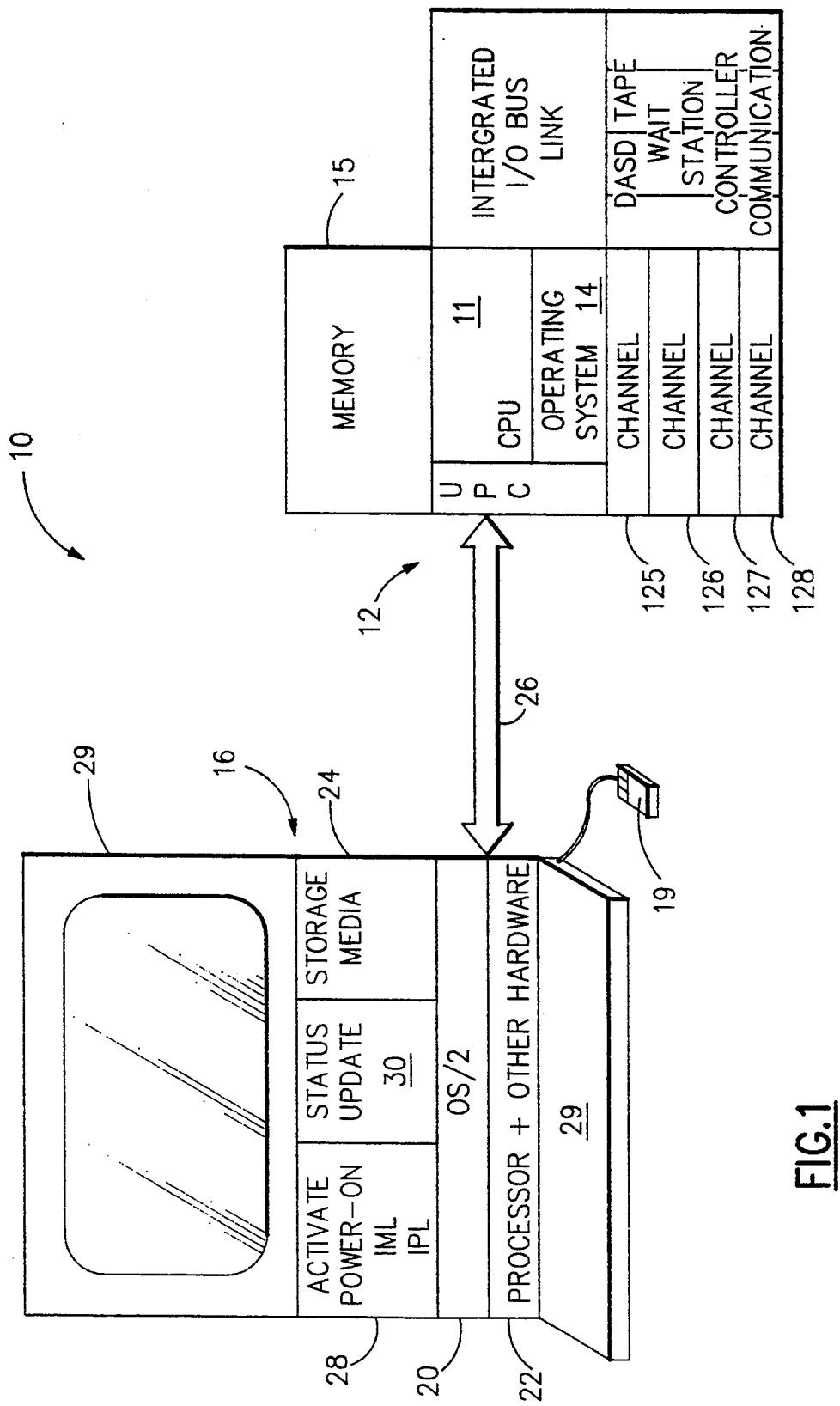
FIG. 1 is a block diagram of a computer system according to the present invention.

Referring now to the drawings in detail wherein like reference numerals indicate like elements throughout the several views, FIG. 1 illustrates a computer system generally designated 10 according to the present invention. System 10 includes a local processor console 16 and an associated central electronic complex 12. By way of example, local processor console 16 comprises an IBM PS/2 personal computer including a processor and other hardware 22 and an IBM OS/2 operating system 20 which provides multitasking capability. Local processor console 16 further comprises a storage medium 24 such as hard disk, a CRT 29, and microcode 28, 30 which is described in more detail below to control the user interface to CEC 12. Local processor console 16 provides operational control (i.e. activators, turns-off, etc.) and services CEC 12; however, CEC 12 can run its own programs which are ultimately stored in memory 15 to perform independent functions using CEC 11 once CEC 12 is activated by local processor console 16. In the illustrated example, local processor console 16 is tightly coupled to CEC 12 by LPC-CEC communications facility 26.

FIG. 2 illustrates the use of local processor console 16 to activate CEC 12, and associated FIGS. 3-7 and 17 illustrate display screens presented to the operator at local processor console 16 to provide the interface for activating CEC 12.

Figure 3:
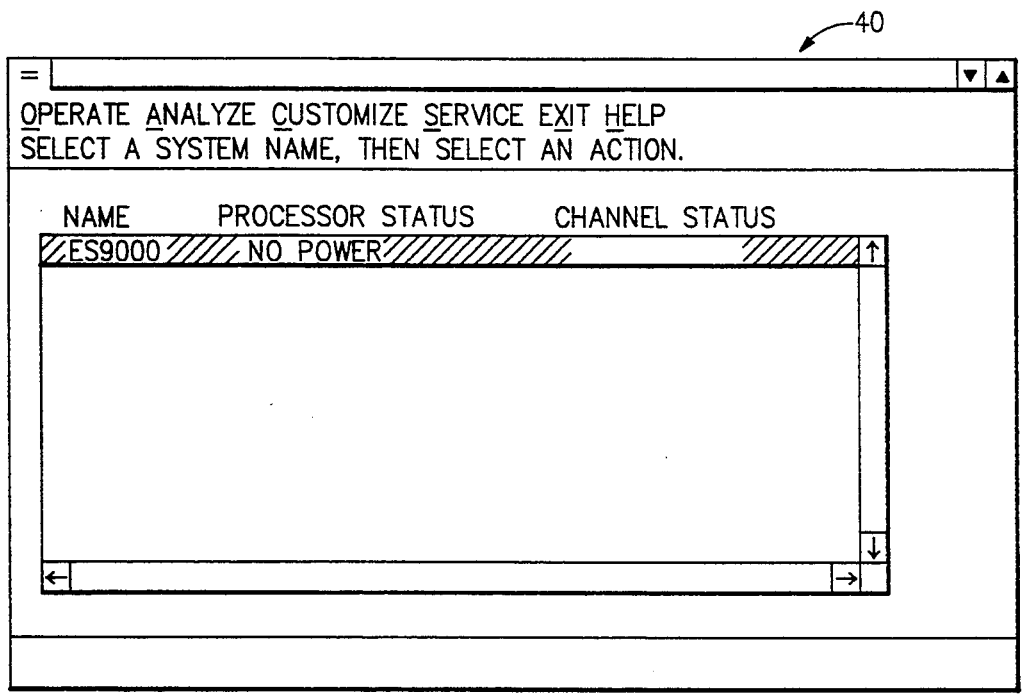
FIGS. 3-7 and 17 are display screens which are presented to a user during operation of the computer system of FIG. 1 to activate the central electronic complex.

Initially, CEC 12 is Off and LPC 16 is operating (step 98) and initialized (step 99), LPC 16 display screen 40 illustrated in FIG. 3 indicates "no power" as the status of CPU 11 (step 100). Display screen 40 also includes action bar categories—"Operate", "Analyze", "Customize", "Service", "Exit" and "Help". As described in more detail below, LPC 16 previously learned the status of CPU 11 by means of status update microcode 30 (step 102).

Figure 4:
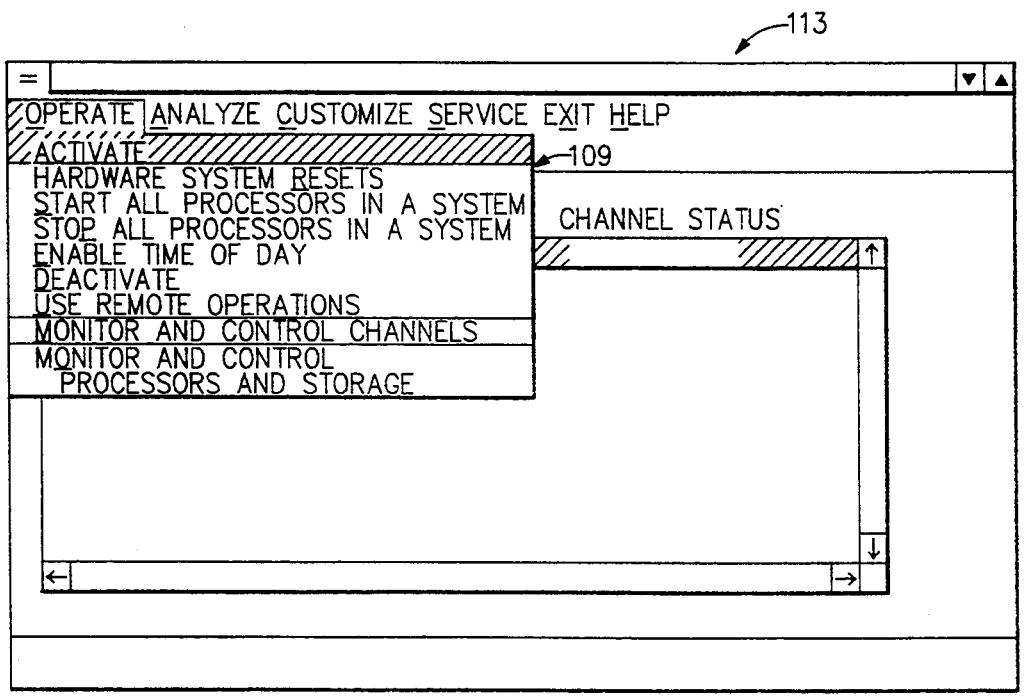

Next, in the illustrated example, the user selects the "Operate" action bar by means of a mouse 19 or keyboard 29 (step 104). After selection of the "Operate" action bar, a pull down 109 of display screen 113 illustrated in FIG. 4 is displayed beneath "Operate". Then, in the illustrated example, the user selects the "Activate" action to initiate activation of CPU 11 (step 104).

Figure 17:
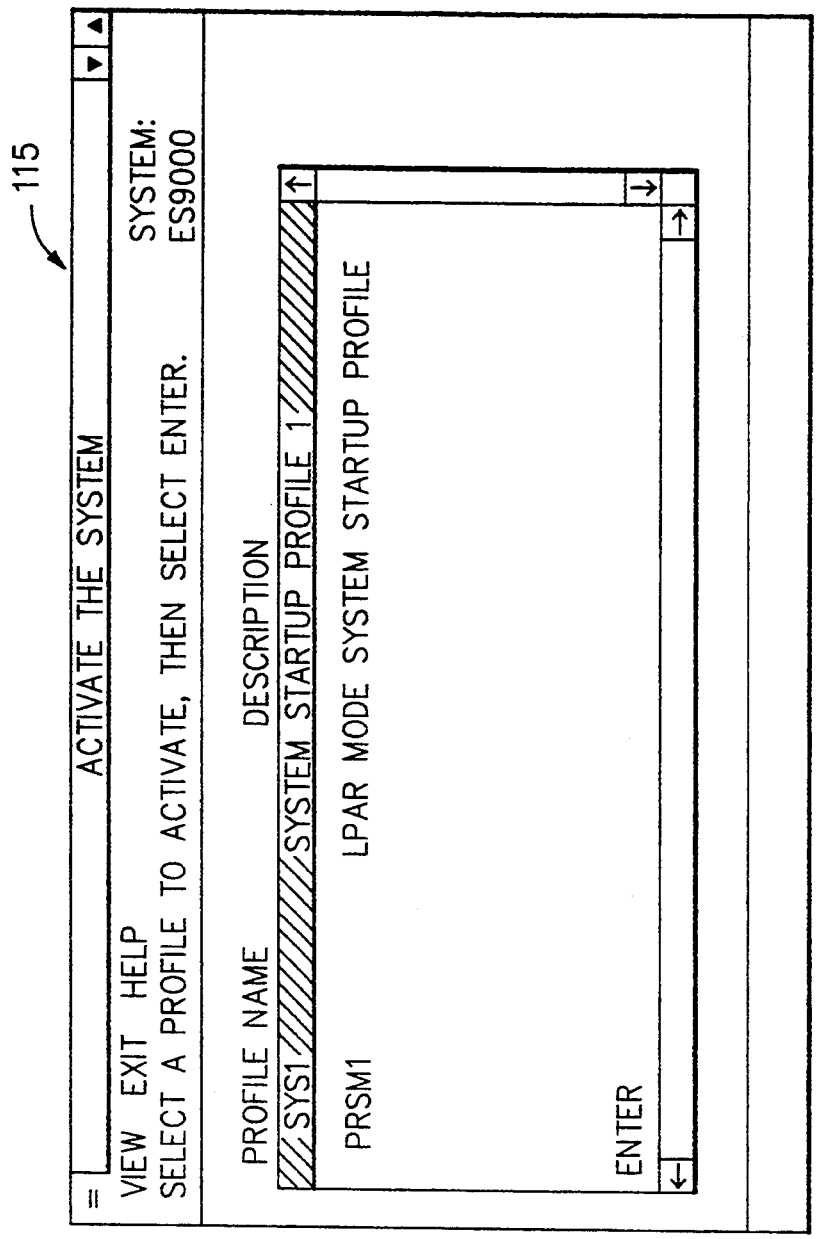

The reaction of local processor console 16 to the "Activate" action selection from screen 113 assumes a previously defined profile named SYS1 and yields display screen 115 illustrated in FIG. 17. Then, the operator selects SYS1 as the system to be activated. The "Activate" action includes power on, initial microprogram load (IML) and initial program load (IPL) functions, and in order to implement these functions, local processor console 16 must know the address of the microprogram within local processor 16 that is to be loaded and the address of the tape or disk that contains the program to be IPL loaded. This information was previously by the profile.

After the user selects the "Activate" action and the SYS1 profile, the operating system 20 reads the selection and calls the "Activate" microcode 28 which in turn powers on CEC 12 (step 106) as described in more detail below. After CEC 12 is powered on, a Universal Power Controller (UPC) card within CEC 12 sends a response back to activate microcode 28 indicating that the power on operation was successful (step 108).

Figure 5:
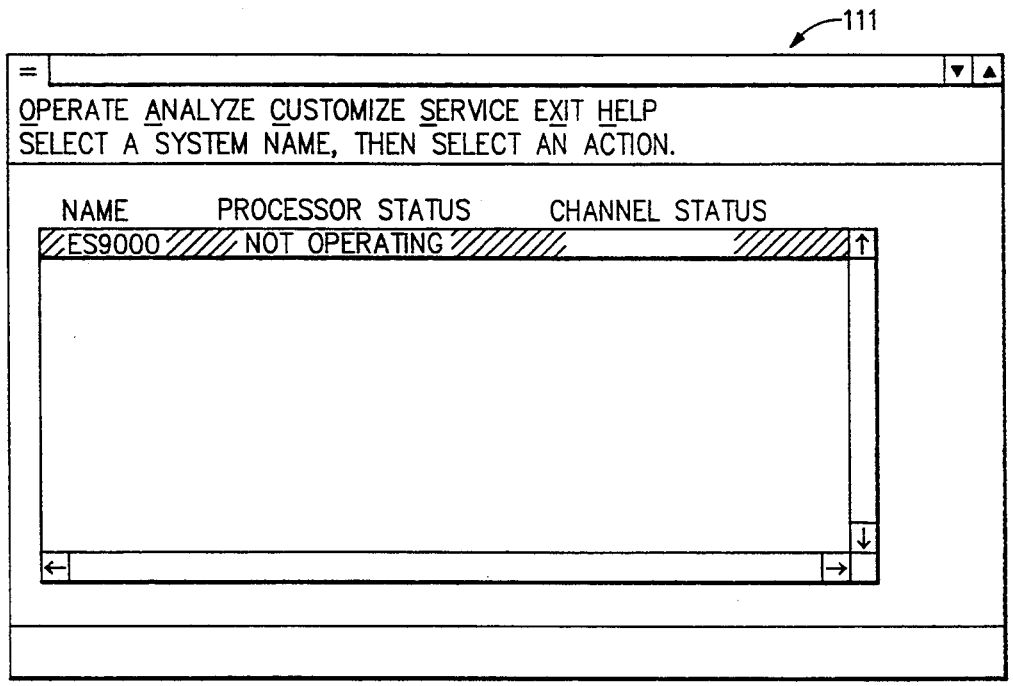
Figure 6:
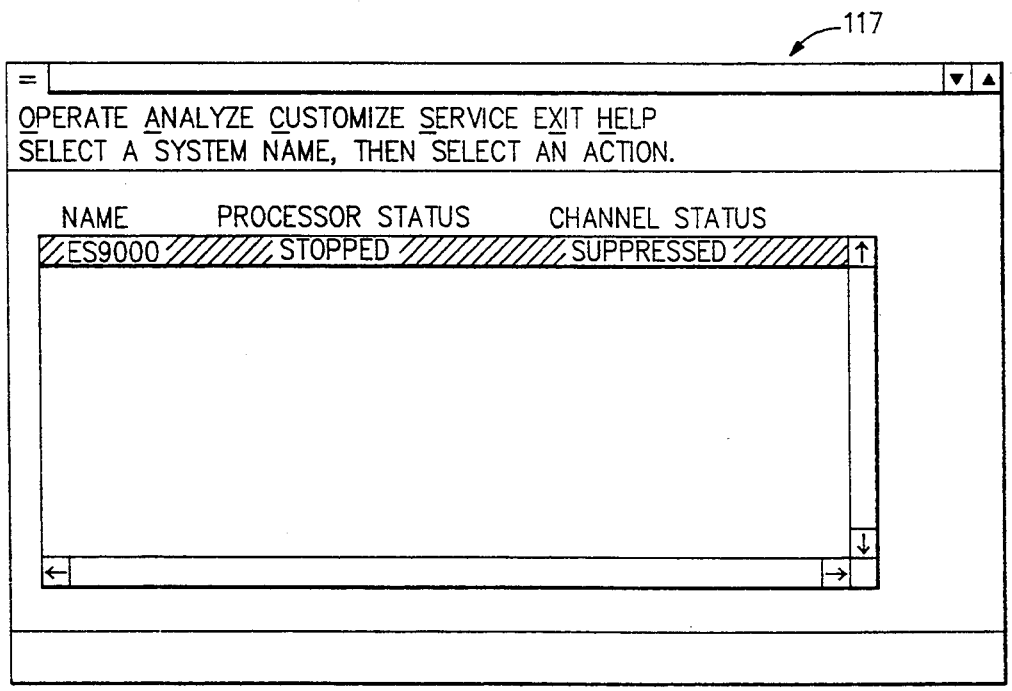
Figure 7:
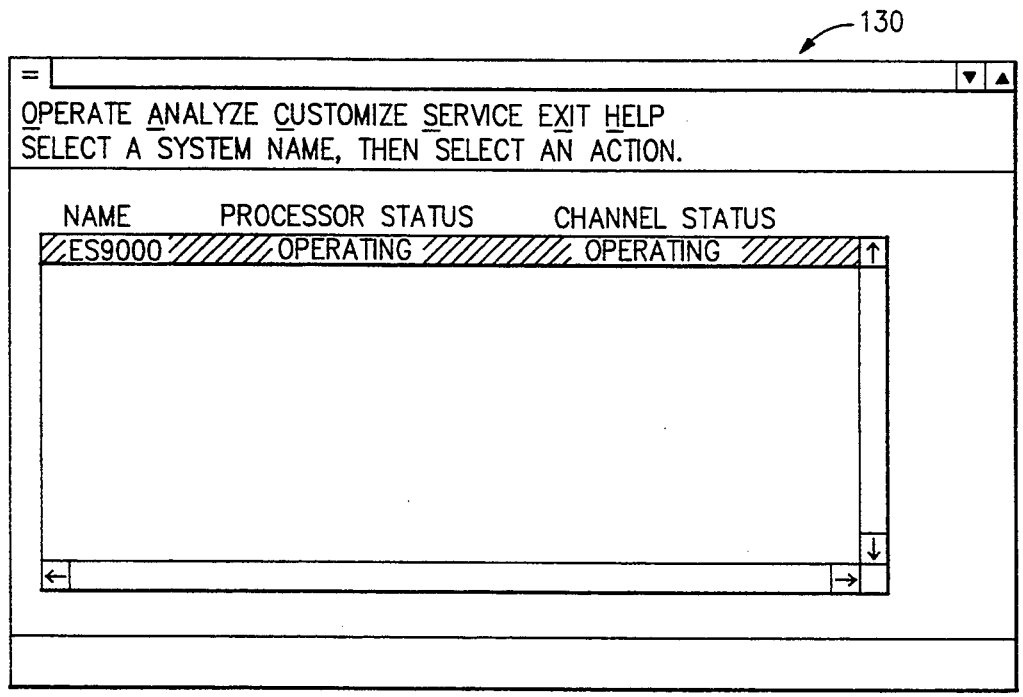

Next, the activate microcode 28 updates the status of CEC 12 as illustrated by display screen 111 of FIG. 5 to indicate that CPU 11 is "not operating", which is understood to mean that power is on but neither the IML nor IPL functions have been implemented (steps 110-112). Steps 110-112 are described in more detail below. It should be noted that a generalized data stream converter 205 converts this and each high level command into a generalized data stream (which identifies each field and its related parameter), and a router function 207 selects the corresponding low level function, in this case, activate function 28. Next, the activate microcode 28 reads the profile data to learn the IML or powered-on reset parameters which indicate the location of the microprogram that is to the loaded into memory 15 of CEC 12, how much expanded and central store memory is required, a channel configuration, and a name of the microprogram to be loaded (step 114). After reading these parameters, the activate microcode 28 directs the loading of the microcode from disk 24 to memory 15 (steps 114-116). Next, the status update microcode 30 updates the processor status (step 118) as illustrated by display screen 117 of FIG. 6 to indicate that the status of CPU 11 is "stopped" and the status of the channels is "suppressed" (step 120). The "stopped" status is understood to mean that the power on and IML functions have been implemented, but the IPL function has not yet been implemented. The "suppressed" status of the channels indicates that the processor will not be putting additional I/O commands onto the Channel Subsystem's job queue (since the processor is stopped) and the channel will complete operations already on the channel subsystem's job queue. Next, activate microcode 28 reads the aforesaid profile again to obtain the IPL address, optional load parameters, the type of load (normal or clear), and the processor target (CPU 11). The activate microcode 28 controls and sequences the hardware doing the actual loading. The hardware involved in the IPL function comprises the hardware of the channel which is connected to the tape or disk that contains the program to be loaded, the memory 15 which stores the program, and the CPU 11 which participates in the IPL function by loading another support program which is executed by CPU 11 to perform the actual load (step 122, 124). At this time, CEC 12 including CPU 11, memory 15, and all channels 125-128 and other hardware are activated, and status update microcode 30 updates the status of CEC 12 as illustrated by a display screen 130 of FIG. 7 (steps 126, 28). As illustrated in FIG. 7, the status of CPU 11 is now indicated as "operating", and the status of all channels is indicated as "operating".

Figure 9:
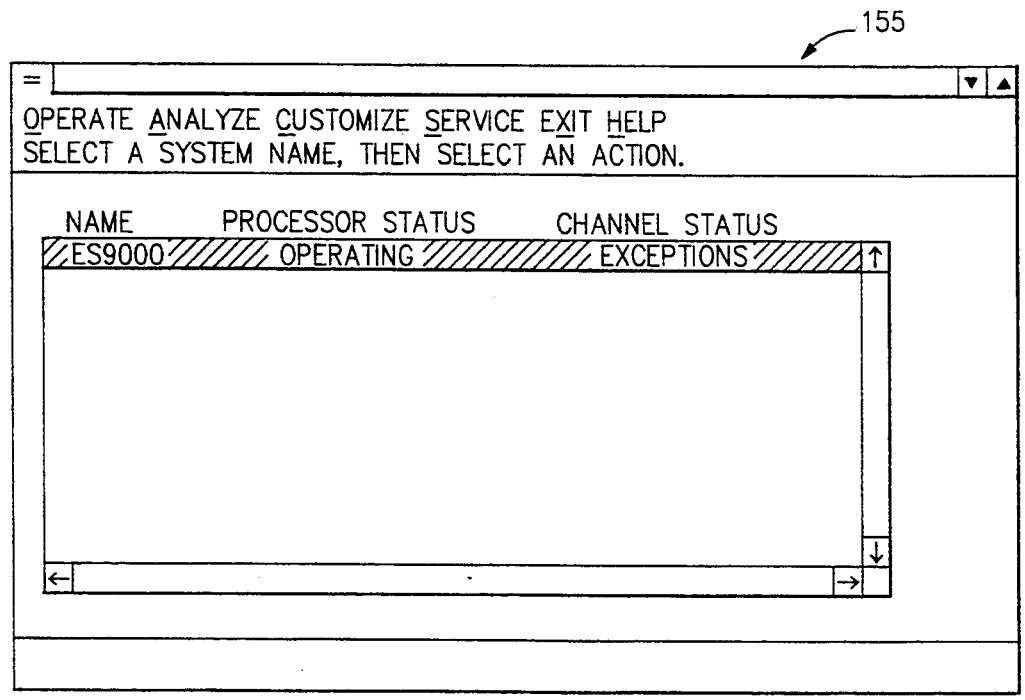
FIGS. 9-12 and 16 are display screens that are displayed on the local processor console of the computer system of FIG. 1 during recovery from the channel problem.
Figure 8A:
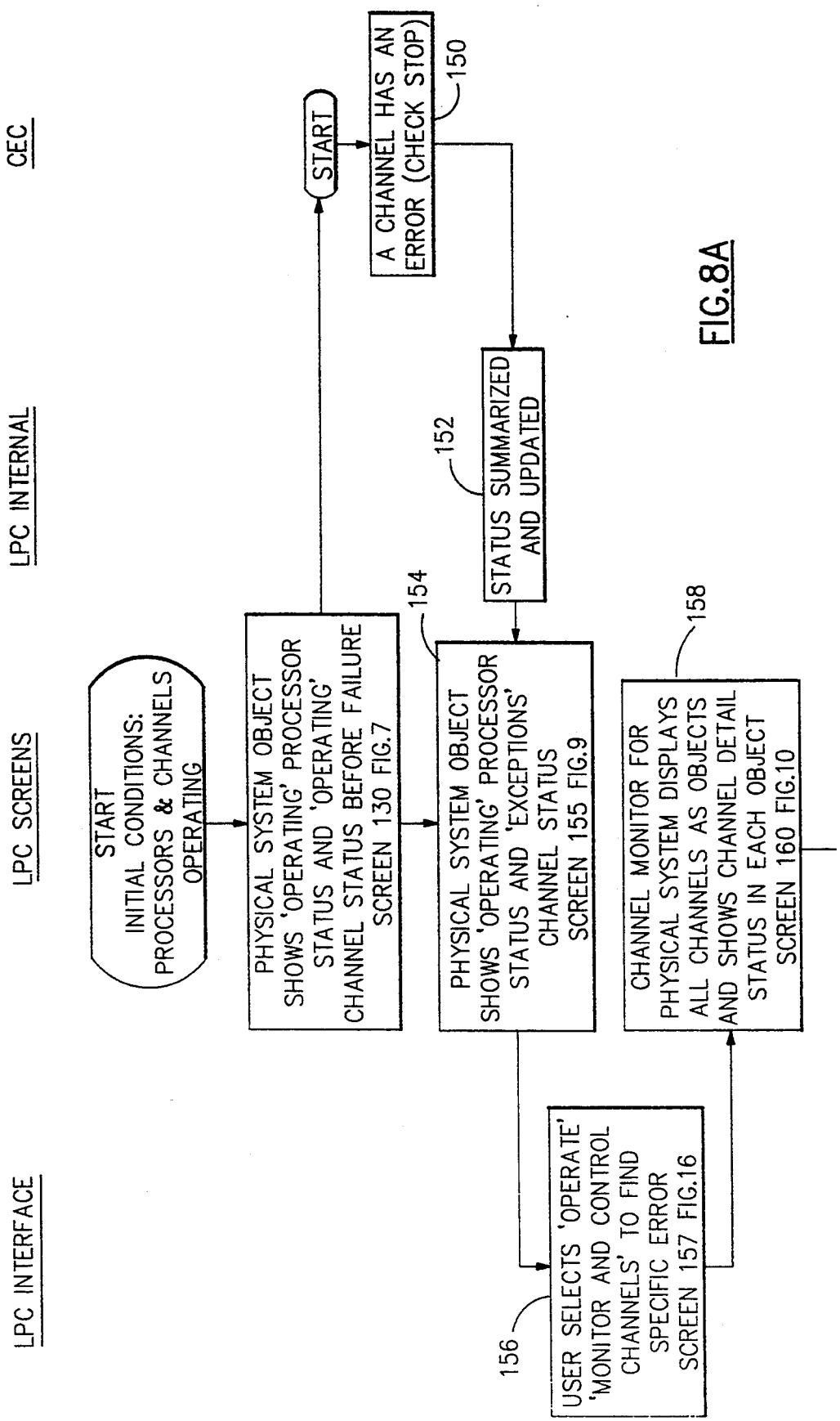
FIG. 8 is a flow diagram illustrating operation of the computer system of FIG. 1 when a problem arises with a channel in the central electronic complex.

FIG. 8 is a flow diagram illustrating the user interface and internal functions that occur when a problem arises with one of the channels 125-128 (step 150). For example, the error could be due to a hardware failure. In such a case, machine state/machine check logic within CEC 12 or a diagnostics function which runs in CPU 11 and analyzes responses from the channel detects the failure. Then, the machine state/machine check logic generates an error signal which is sent to status update microcode 30 (step 150). In response, status update microcode 30 checks the status of each channel 125-128 and CPU 11 summarizes the status for the channels and summarizes the status of the processor(s) (step 152), and updates screen 29 with a display 155 illustrated in FIG. 9 (step 154). The summarization algorithm is as follows. If anyone of multiple channels (or the lone channel in a single channel environment) is not operating, then the summary is "Exceptions". Similarly, if any one processor in a multiprocessor environment is not operating or if CPU 11 is not operating in a single processor environment, then the processor status would be "Exceptions"; however, as illustrated in FIG. 9 the status of CPU 11 in the illustrated example is "Operating"; the only problem is with one of the channels.

Figure 10:
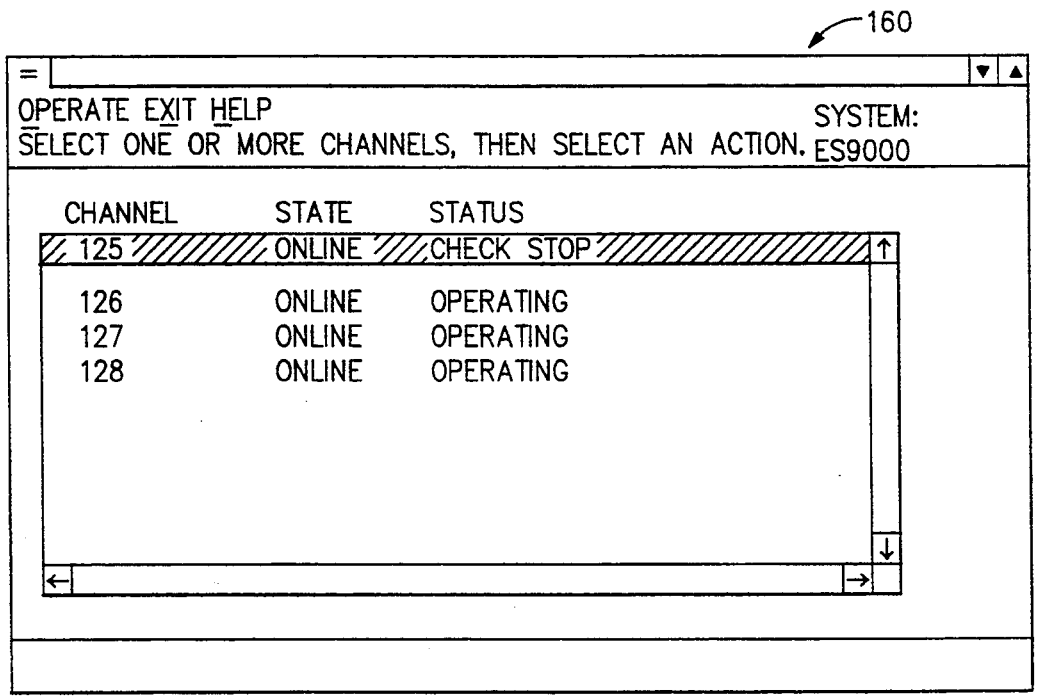
Figure 11:
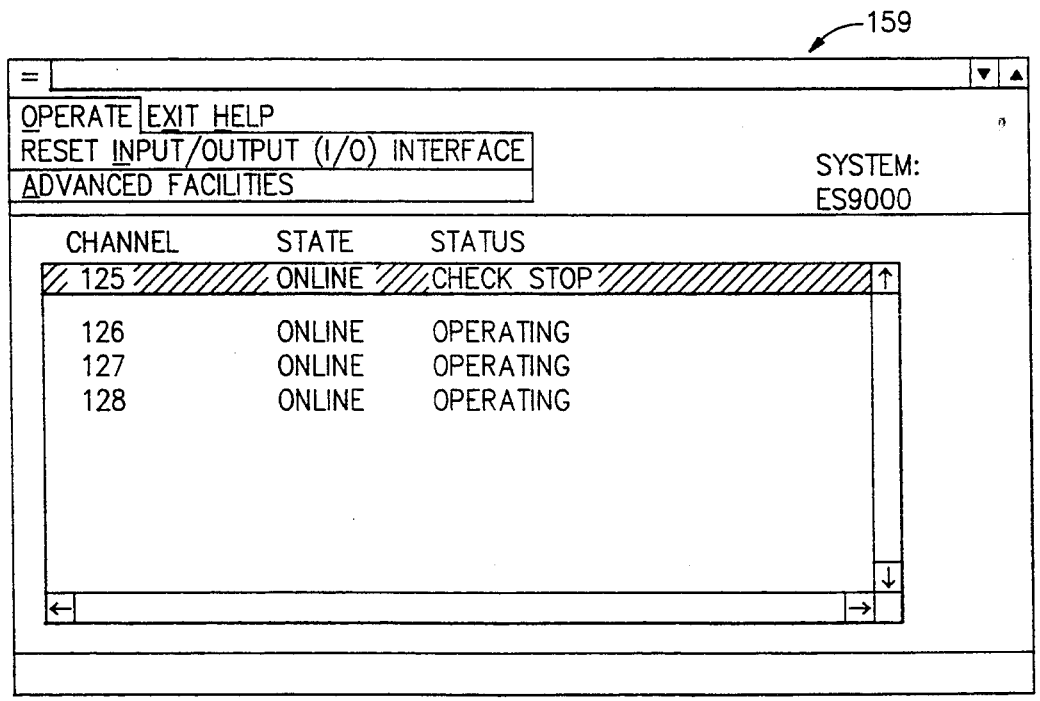
Figure 12:
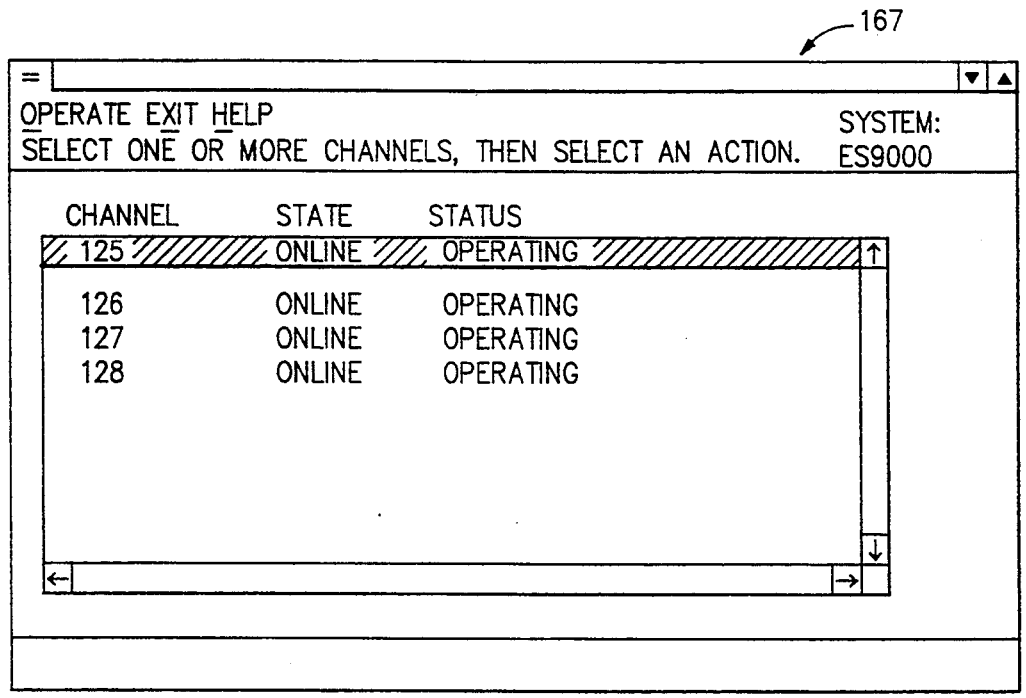

Next, because the user now knows the problem is with one of the channels the user selects the "Operate" action bar and then selects "Monitor and Control Channels" action from the pull down on display 157 (see FIG. 16) (step 156). As a result, local processor console 16 presents a display screen 160 illustrated in FIG. 10, which lists the channels individually and the state and status of each channel. Display screen 160 appropriately indicates that the status of channel 125 is "check stop" (step 158). Next, the user selects channel 125 (in the illustrated example, the selection bar is preprogrammed to appear on initial display of screen on channel 125, but if another one of the channels had the problem, then the user could move the selection bar to the problem channel by means of a cursor key or a mouse). Then, the operator selects the "Operate" action bar, then selects u Reset Input/Output (I/O) selection from the pull down as illustrated by display screen 159 of FIG. 11 (steps 160, 162). In response, the Channel portion of IML or power-on reset function is executed again on channel 125 i.e. loading internal code of channel and resetting channel hardware, for the selected channel 125 (step 164), and subsequently the machine state hardware reports channel 125 is "operating" (step 166). Status update microcode 30 receives the "channel 125 is operating" signal and appropriately updates the status of channel 125 as illustrated by display screen 167 of FIG. 12 (steps 168, 169). Next, the user selects the "Exit" action bar, a function key or an escape key to exit from display screen 167 and return to display screen 130 illustrated in FIG. 7 (steps 170, 171).

Figure 14:
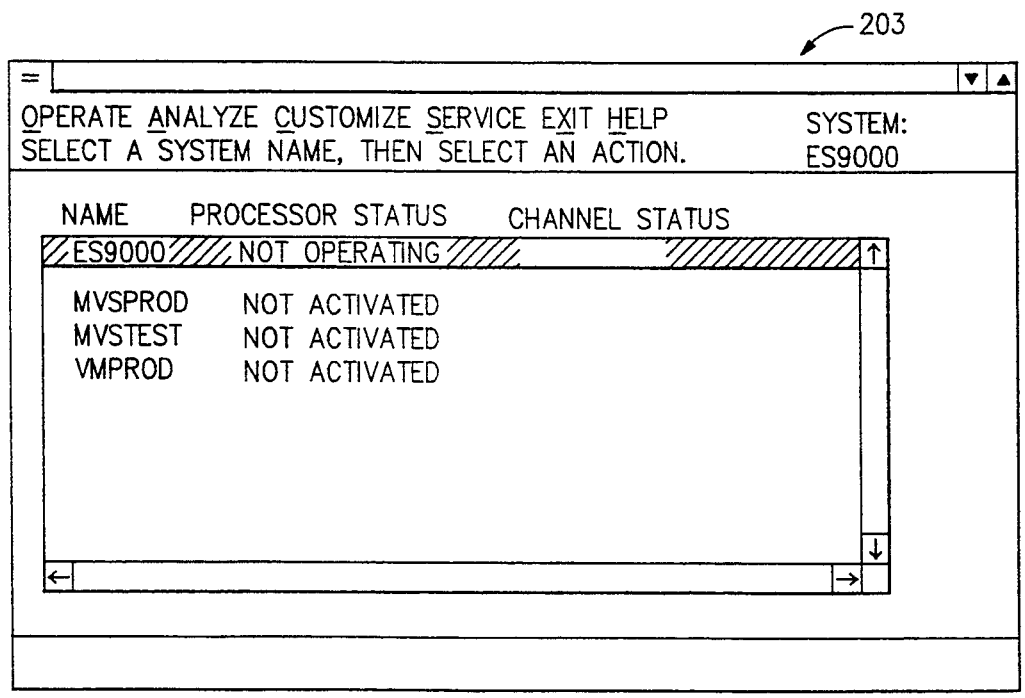
Figure 13A:
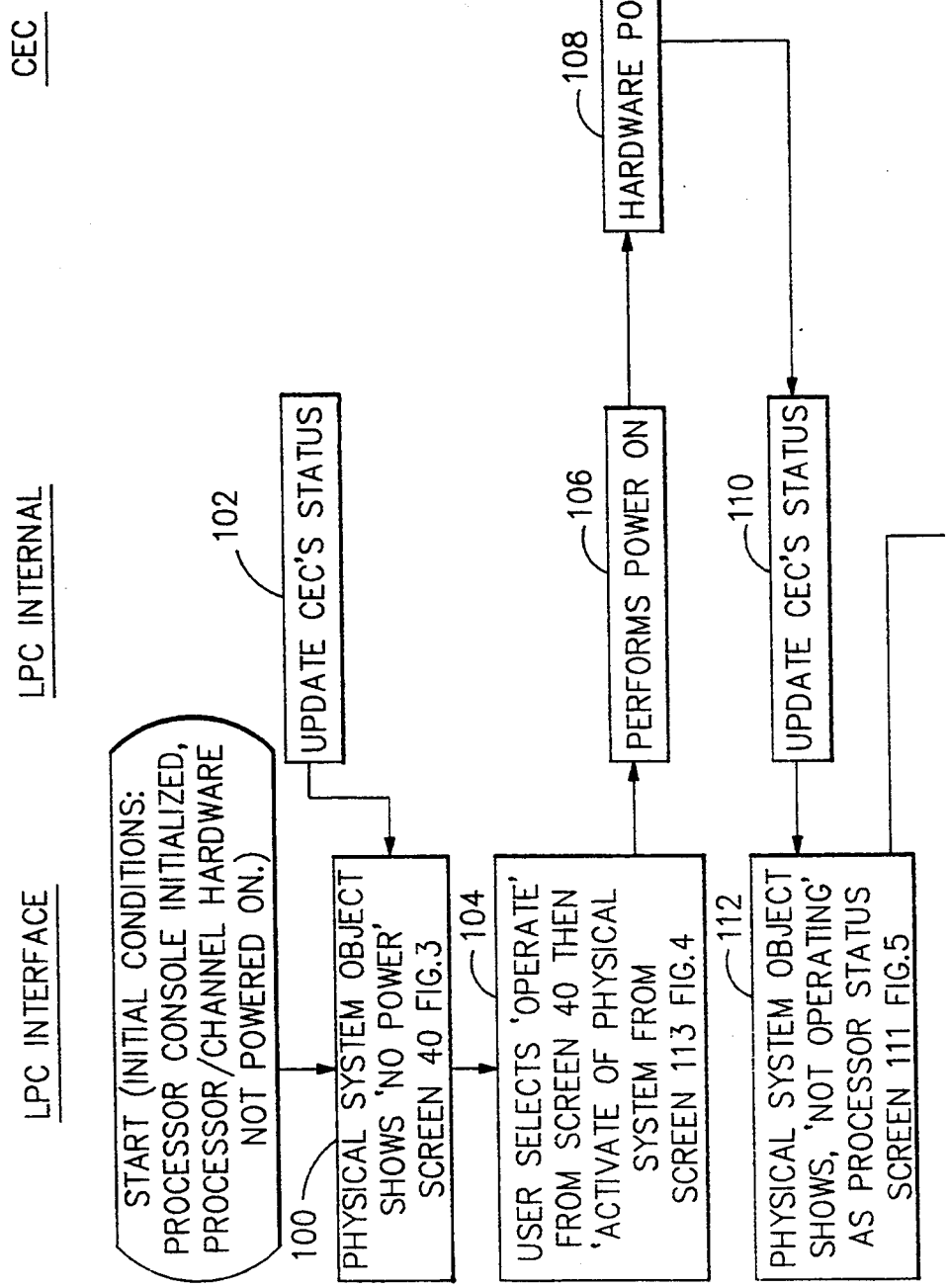
FIG. 13 is a flow diagram illustrating operation of the computer system of FIG. 1 during activation of logical partitions or combinations of elements within the central electronic complex.
Figure 15:
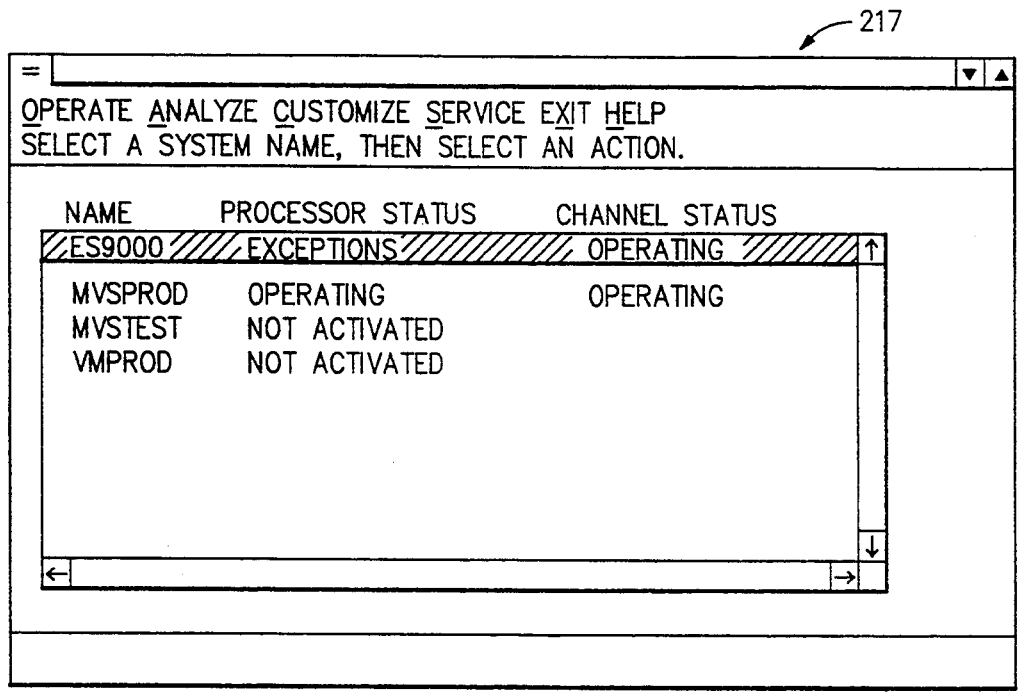

FIG. 13 is a flow diagram illustrating the user interface and internal functions which are performed during activation of the CEC 12 into PRISM mode. Steps 100, 102, 104, 106, 108, 110, 112 and 114 are the same as described above to begin the activation process except that the "PRSM1" profile is selected in step 104. Then, in response to the IML or power-on reset function of Activate program 28, the hardware of CEC 12 resets as described above in step 116 except that the "PRSM1" profile parameters indicate a different microprogram to be loaded (PRISM microcode) (step 200). The PRISM microcode in this case supports logical partitions mode of operation. As noted above in the background section, the PRISM program was previously known (i.e. prior art) to support logical partition mode of operation. Next, status update microcode 30 updates the status of the logical partitions defined by the profile parameters to the PR/SM program (step 202). Status program 30 adds the logical partitions to the display and causes display screen 203 of FIG. 14 (step 204). As illustrated by display screen 203, each of the logical partitions has a logical name associated with it i.e. "MVSPROD", "MVSTEST" and "VMPROD", and these are listed below the name of real CEC 12 "ES9000". Next to the CEC 12 name is its status which at the present time is "not operating" for reasons described above, and next to the name of each of the logical partitions is the status of the logical partition which at the present time is "Not Activated". The "Not Activated" status indicates that the CEC 12 is IML'ed but that no logical partitions have not been activated. The activate microcode 28 obtains the list of logical partitions from the PR/SM program and then proceeds to activate each logical partition. Next, the activate microcode 28 initiates an activation of one of the logical partitions (step 206) (LPAR activate) and during this process, allocates specific physical resources for the logical partition according to the allotments in the profile parameters (described in step 106) i.e. number of channels, amount of memory, required as described above. In step 208, specific areas of memory are reserved for the logical partition and channel(s) are allocated. Then, the IPL function is initiated by the PR/SM program onto a physical CPU which has been assigned to the logical partition by the PR/SM program to do the work of a logical processor. The CPU loads the appropriate program from the I/O disk or tape set forth in the profile (step 208). Next, the status update microcode 30 updates the status of the logical partition that was activated in steps 206 and 208 (steps 210, 212). A resultant display screen 217 is illustrated FIG. 15 and shows the status of the "MVSPROD" logical partition as "Operating". Display screen 217 also illustrates that the status of CEC 12 is "Exceptions" because at least one of the logical partitions is not operating at this time. The activation of the other logical partitions "MVSTEST" and "VMPROD" are performed in subsequent iterations of steps 206, 208, 210 and 212, at which time the status of each logical partition will be "Operating", and the status of CEC 12 will be "Operating".

Figure 18A:
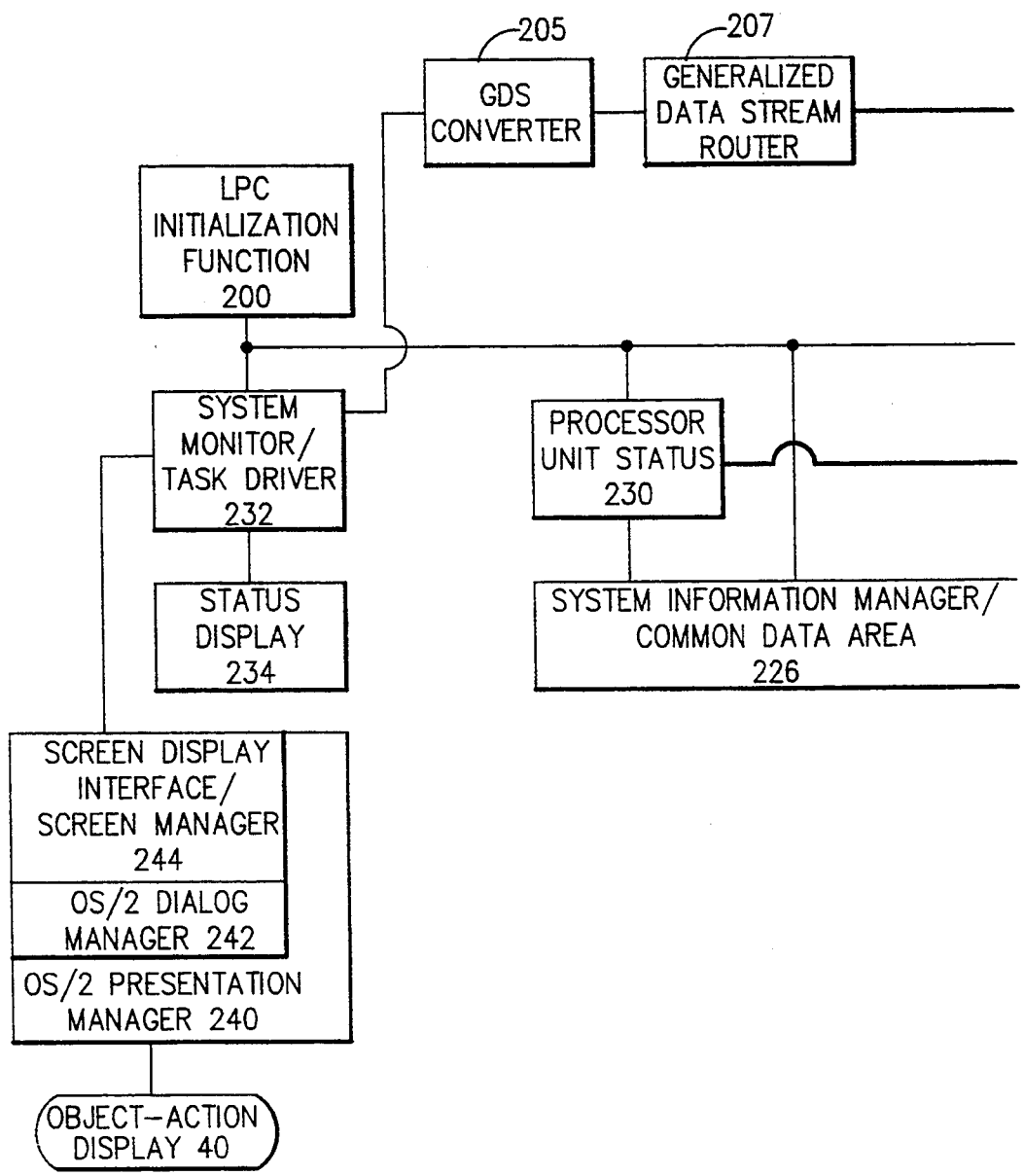
FIG. 18 is a block diagram illustrating components of the local processor console.
Figures 18, 18B:
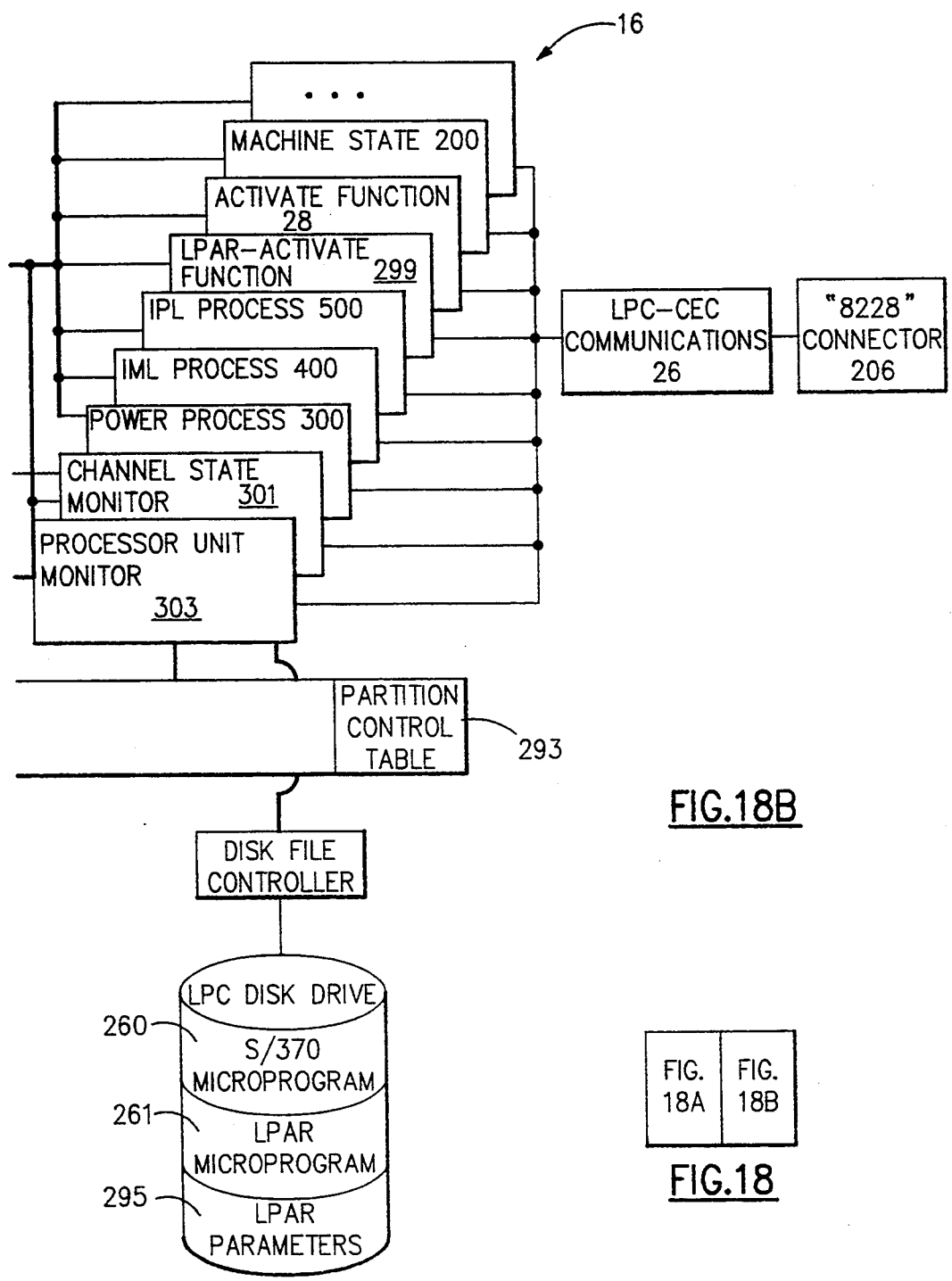
Figure 19:
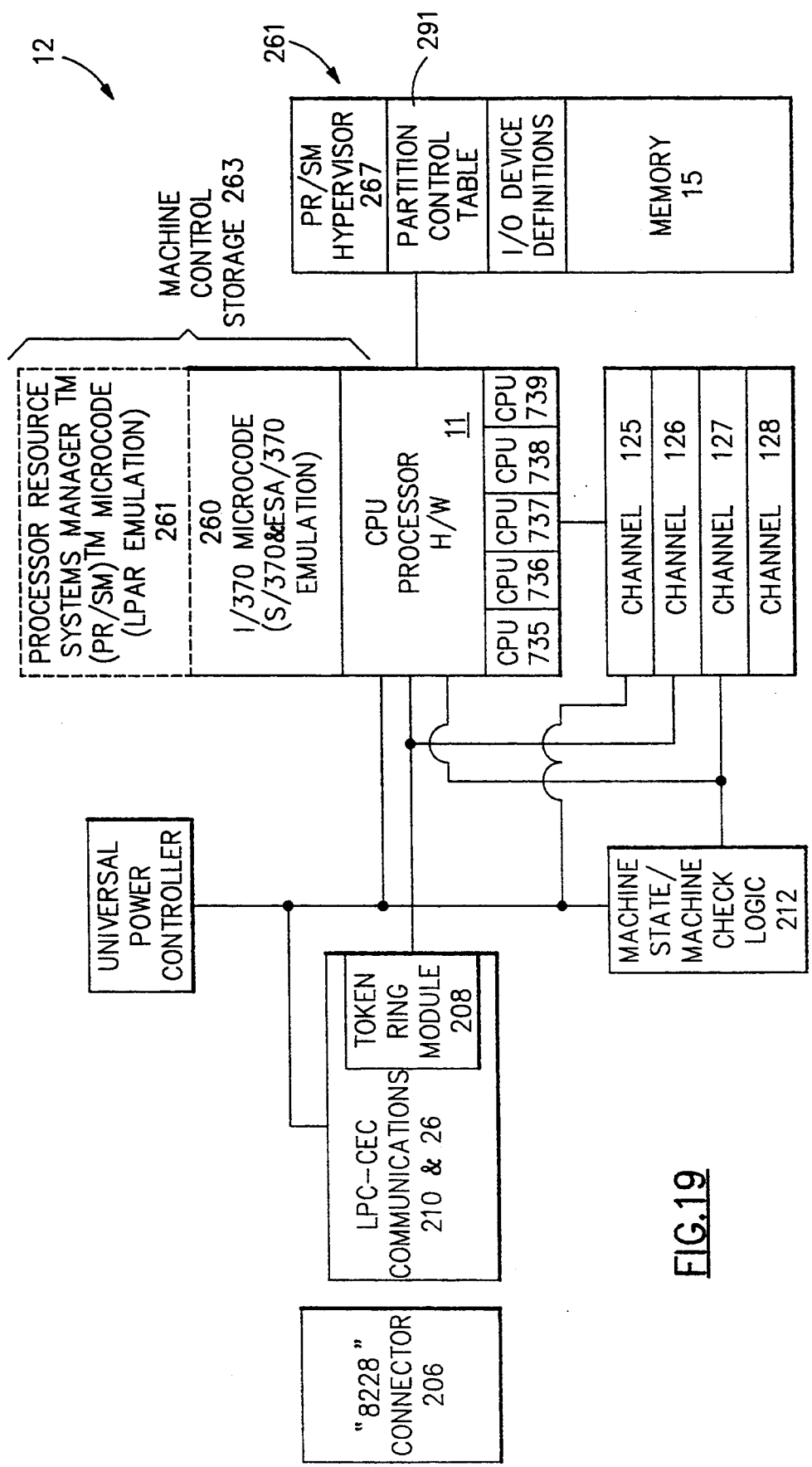
FIG. 19 is a block diagram illustrating components of the CEC.

FIGS. 18 and 19 illustrate in detail step 102 of FIG. 2 in which the initial status of CEC 12 is determined. A local processor console initialization function 200 starts state monitoring programs 301 and 303 to determine CEC 12's status (i.e. processor(s) status and channels status,) LPC initialization function 200 sends a service word to CEC 12 via a token ring LAN card 204 in local processor console 16, an IBM 8228 token ring connector, a token ring interface module 208 within CEC 12, and a LPC to CEC communications facility 210 within CEC 12. The service word requests initialization of CEC 12 and status information for the CEC 12 (i.e. processor(s) and channels). Next, machine/state machine check logic 212 within CEC 12 senses the current state of CEC 12 and collects status information. The LPC to CEC communication logic 210 then transmits a service word indicating the current state of CEC 12 to state monitoring programs 301 and 303 within LPC 16. The state monitoring programs 301 and 303 update a common data area 226 (system information manager—SIM) to indicate the current status for CEC 12. Then, the state monitoring programs 301 and 303 signal the processor unit status function 230 function 202 that status has been updated in SIM 212. PUS function 230 retrieves the status for the real objects i.e. processor(s) and channels and summarizes the status of the processor(s), if there are more than one and the status of the channels as described in more detail below. Processor unit status function 230 then updates the summarized status field for the processor(s) and channels in SIM 226. Processor unit status function 230 also notifies a task driver function 232 that status has changed for an object. Then, task driver function 232 requests status information from a status display function 234 to fill in the information on screen 40 (FIG. 3). Then, status display function 234 retrieves the status information from SIM 226 and formats the information for display on screen 40. Status display function 234 then passes the formatted of status information to task driver function 232, and task driver function updates screen 40 with the new processor status information, which at this time is "no power". Even though SIM 226 contains the status of the channels as not initialized, this status is indicated by blanks for the channel status in screen 40.

The following is a detailed description of steps 106 and 108 of FIG. 2 in which CEC 12 is powered on. After the user the selects the "Activate" command from the "Operate" pull down, a presentation manager function 240 of the OS/2 operating system detects the location on the screen of the selection. This location information is passed through a dialog manager program 242 running on the OS/2 operating system and a screen display interface/screen manager 244 to task driver (or system monitor) 232. Then, task driver 232 determines that the selected location corresponds to an "Activate" command for CEC 12, and calls an "Activate function 246". The Activate function 246 presents a list of profiles (screen 115 in FIG. 17) and requests the user to select one. The user selects the profile, which has been previously defined with the parameters to define the way the user wants the system to activate, which is passed to the Activate function the same as "Activate" was passed to task driver 232 above. The Activate function 246 then calls machine state function 200 to determine if CEC 12 is already powered on or IML'ed or IPL'ed. The machine state function 200 then executes a status check of CEC 12 to determine power on IML and IPL states as described above with reference to step 102. In the illustrated example, machine state function 200 returns to Activate function 246 an indication that CEC 12 is not yet powered on. Consequently, the Activate function 246 calls the power-on process 300.

Figures 20, 20B:
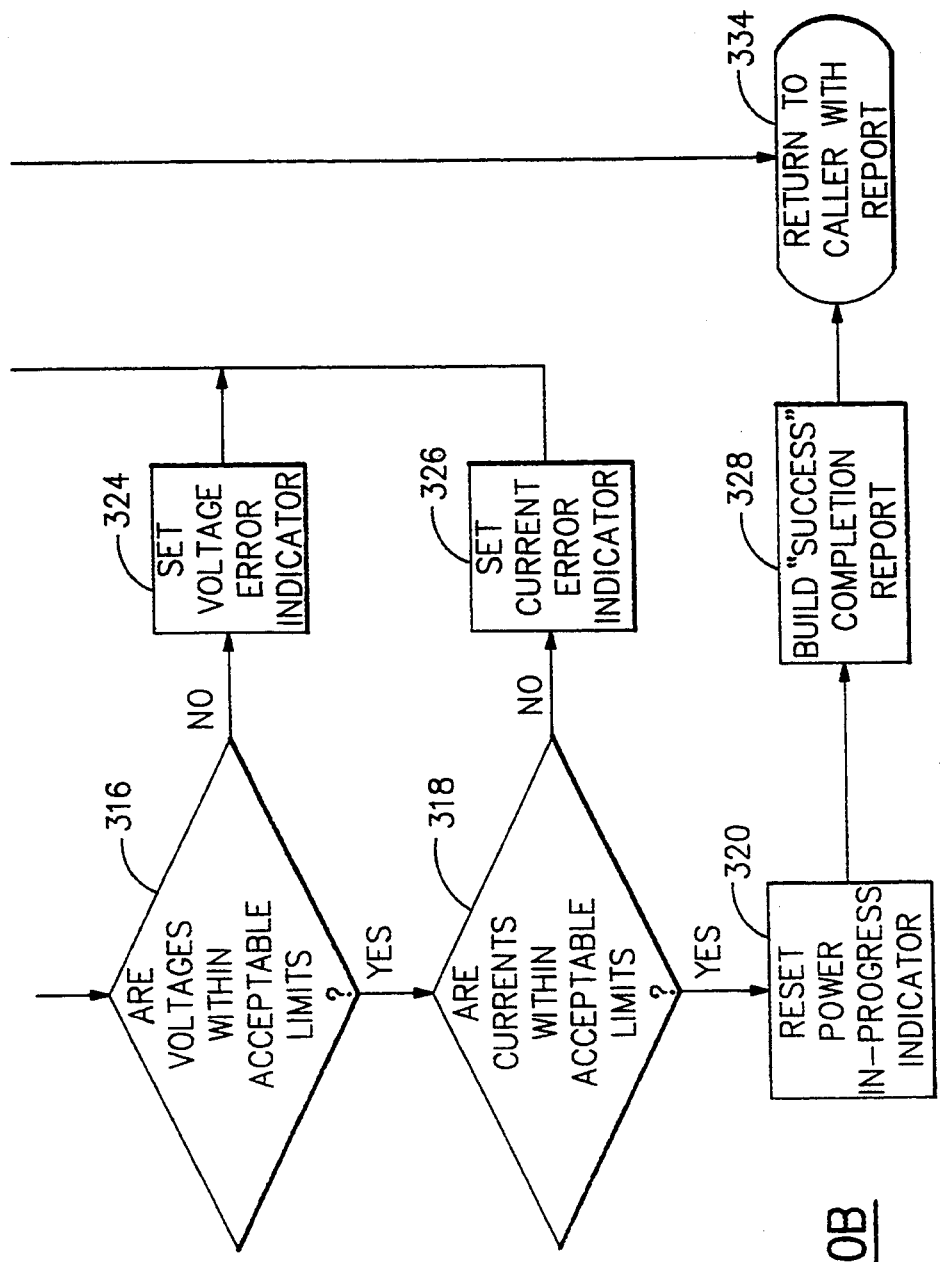
FIG. 20 is a flow chart illustrating a power on process for the CEC.

Power-on process 300 is illustrated in FIG. 20 and is called whenever the processor power in CEC 12 is to be turned on. First, power-on process 300 resets an external "Basic Check Indicator" and all error indicators (step 302). Next, an external "power-in-progress" indicator is set to show that a power-on sequence is occurring (step 304). Next, the air moving devices (i.e. cooling fans) are turned on (step 306), and the power on process waits a predetermined period until the air flow stabilizes (step 308). Next, the air flow is checked against internal specifications to ensure that it is adequate (decision block 310). If the air flow is not adequate, an external "airflow" indicator is set (step 322), a "failure" completion report is built (step 330), an external "basic check" indicator is set (step 332) and a report is returned to the caller (step 334) indicating whether the power-on process was successful. Returning to step 310, if the air flow is adequate, the power supply is turned on (step 312) and the power on process waits a predetermined period until the power supply stabilizes (step 314). If the power supply voltage is outside the internal specifications (decision block 316), an external "voltage error" indicator is set (step 324), a corresponding failure report is built (step 332) and return with report is made to the caller (i.e. Power process 300) (step 334). Returning to decision block 316, if the voltage is within limits, the current is checked to determine if it is within the internal specifications (decision block 318). If the current is outside specifications, an external "current error" indicator is set (step 326) and (steps 330-334 are executed as above). Returning to decision block 318, if the current is within specifications, the external "power in progress" indicator is reset (step 320) and a "success" completion report is built (step 328) and returned to caller (step 334). It should be noted that if multiple power supplies are involved in the machine design, steps 312-318, are repeated for each power supply.

Next, as illustrated in FIG. 2, status update microcode 30 updates the status of CEC 12 as follows: machine state/machine check logic 212 indicate the state change to LPC to CEC communications logic 210, and communications logic 210 then generates a service word indicating the state change and sends the service word to state monitoring programs 301 and 303. In the illustrated example, the state change is the power on of the CPU processor 11 and channels 125-128. In response, state monitoring programs 301 and 303 update SIM 226 to show that the processor 11 and channels have undergone a status change and the current status of each. Next, the state monitor programs 301 and 303 signal PUS function 230 that the status has changed for a real object. In response, PUS function 230 retrieves the status for processor 11 and the channels, and determines a status summarization for the processor and channels as described more detail below. Then, PUS function 230 updates SIM 226 with the summarized status for processor 11 and the channels, and notifies task driver function 232 that status for an object has changed. In response, task driver function 232 request status information from status display function 234 to provide the "processor status" information for display 111 (FIG. 5). In response, status display, function 234 retrieves the status information from SIM 226 and formats the status information for screen 111. Then status display function 234 provides the formatted status information to task driver function 232, and task driver function updates display screen 111 with the new processor status information. Even though at this time the channel status information is contained in SIM 226, it is not displayed in screen 111. As illustrated by display screen 111, the current processor status is "not operating", and then Activate function 28 initiates initial microprogram load process 400.

Figure 21:
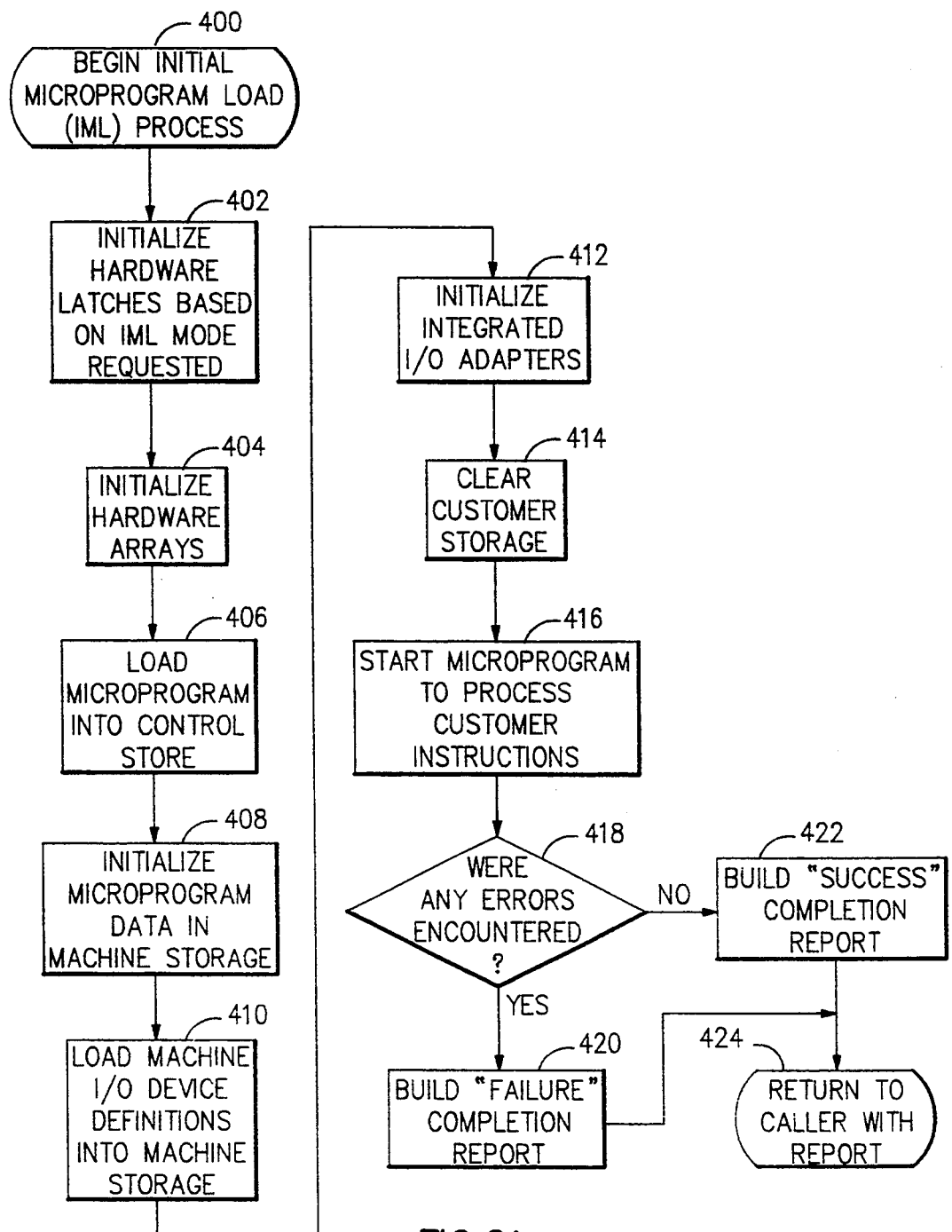
FIG. 21 is a flow chart illustrating an IML process for the CEC.

The initial microprogram load (IML) process 400 illustrated in FIG. 21 is called whenever the processor in CEC 12 is to be initialized. The IML process 400 sends a service word to CPU 11 to set hardware latches in CEC 12 to the necessary initial state, based on the requested IML mode (step 402). Next, the IML process 400 sends service words to set all hardware arrays to their initial state (step 404). Then a hardware microprogram 260 is loaded into the machine's control storage (step 406). Next, microprogram data areas within microprogram 260 are set to an initial state (step 408). Then, the definitions for the machine's I/O devices are loaded into machine storage (step 410). Next, all the integrated I/O adapters are initialized (step 412). Next, all the customer storage is initialized (i.e., cleared to zeros) (step 414). Next, the microprogram (that was loaded by step 406) is started so that it is ready to process customer instructions (step 416). If any errors were encountered, (decision block 418), then a "failure" completion report is built (step 420) and returned to the caller (step 424). If, in decision block 418, no errors were encountered, then a "success" completion report is built (step 422) and returned to the caller (step 424).

Next, the status of CEC 12 is updated as described above in step 111; however, this status update yields display screen 117 in which the processor status is "stopped" and the channel status is "suppressed". Next, Activate function 28 calls an initial program load (IPL) process 500.

Figure 22A:
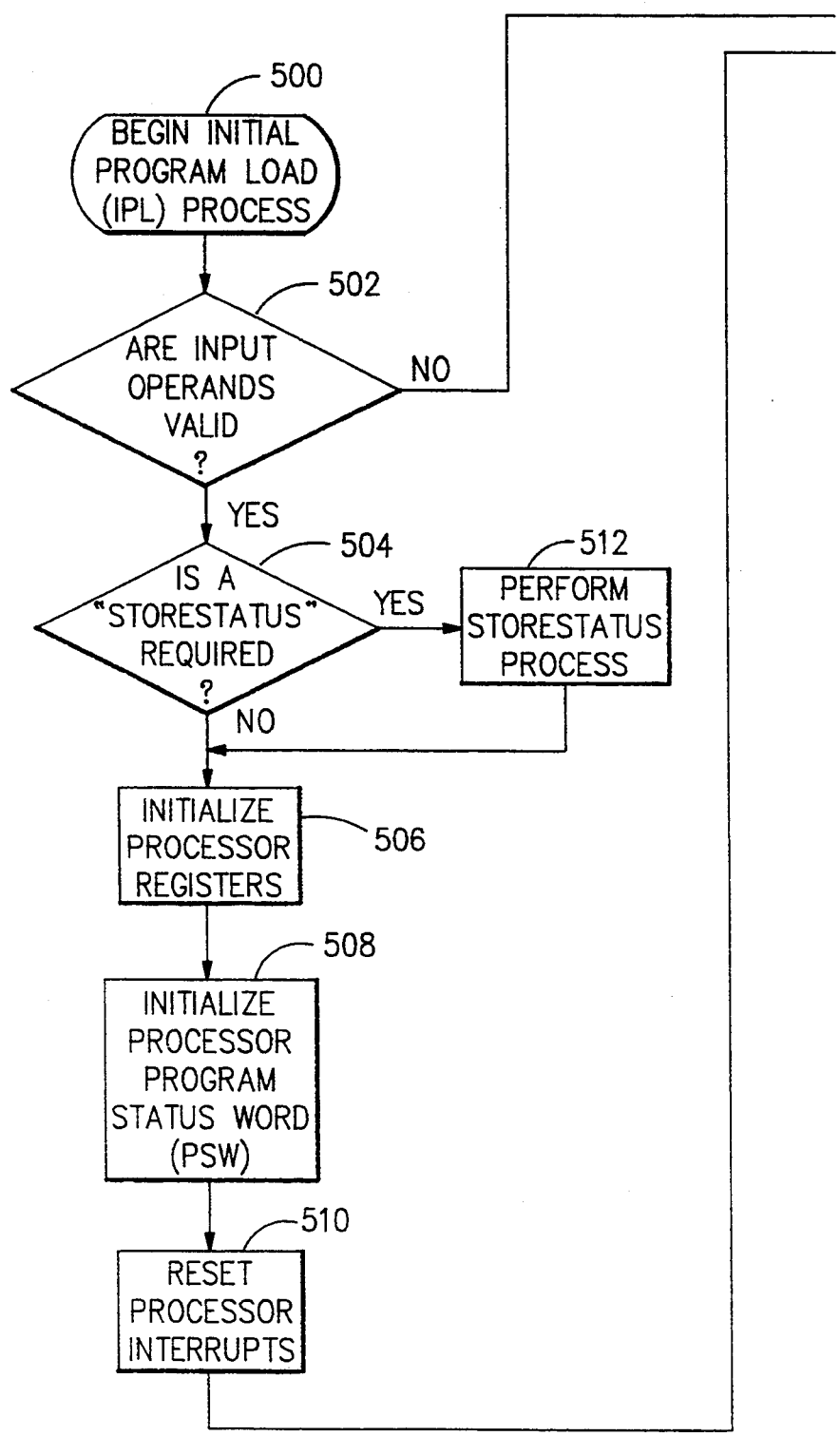
FIG. 22 is a flow chart illustrating an IPL process for the CEC.
Figure 22B:
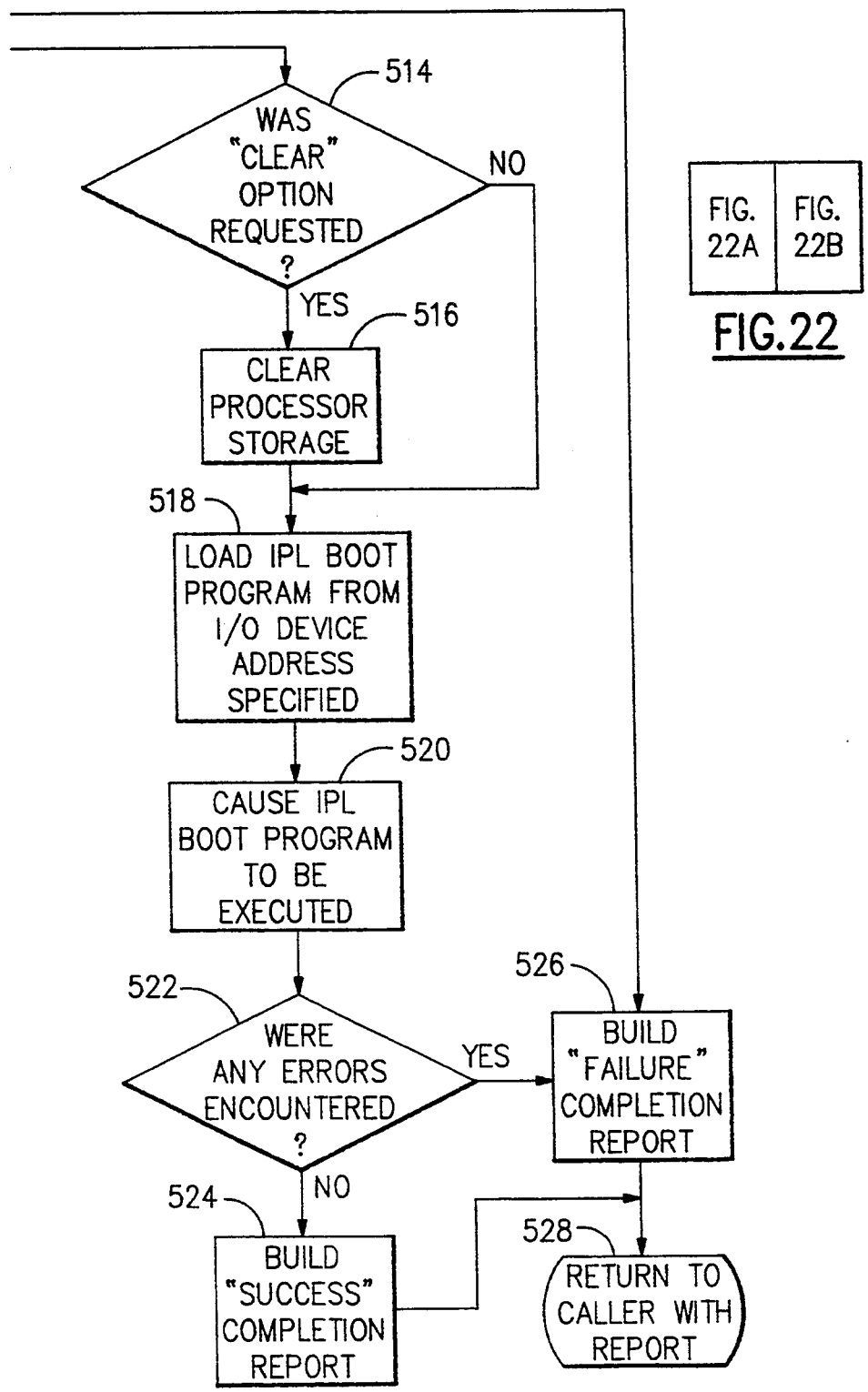

The Initial Program Load (IPL) process 500 is illustrated in FIG. 22 and, is called whenever it is desired to load and run an operating system in the processor (CEC 12). First, IPL process 500 in conjunction with processor 11 initializes a processor Program Status Word (PSW) (step 508). Next, processor microcode 260 resets all pending processor interrupts (step 510). Next, processor microcode 260 determines (from the LOAD operands passed as profile parameters) whether customer storage must be cleared (decision block 514). If storage must be cleared, then the customer storage is reset to zeros (step 516). Whether or not storage was to be cleared, the IPL boot program subsequently is loaded into customer storage from the I/O address specified as an operand to the LOAD command (step 518). Next the IPL boot program is executed (step 520). If any errors were encountered (decision block 522) then a "failure" completion report is built (step 526) and returned to the caller i.e. IPL process 500 (step 528). If no errors were encountered (decision block 522), then a "success" completion report is built (step 524) and returned to the caller (step 528).

Next, the status of CEC 12 is updated as described above in step 110, and afterwards, display screen 130 indicates the processor status of "operating" and the channel status "operating". Referring now to FIG. 8, status update 152 and 164 are performed in the same manner as step 110 described above.

Figure 23:
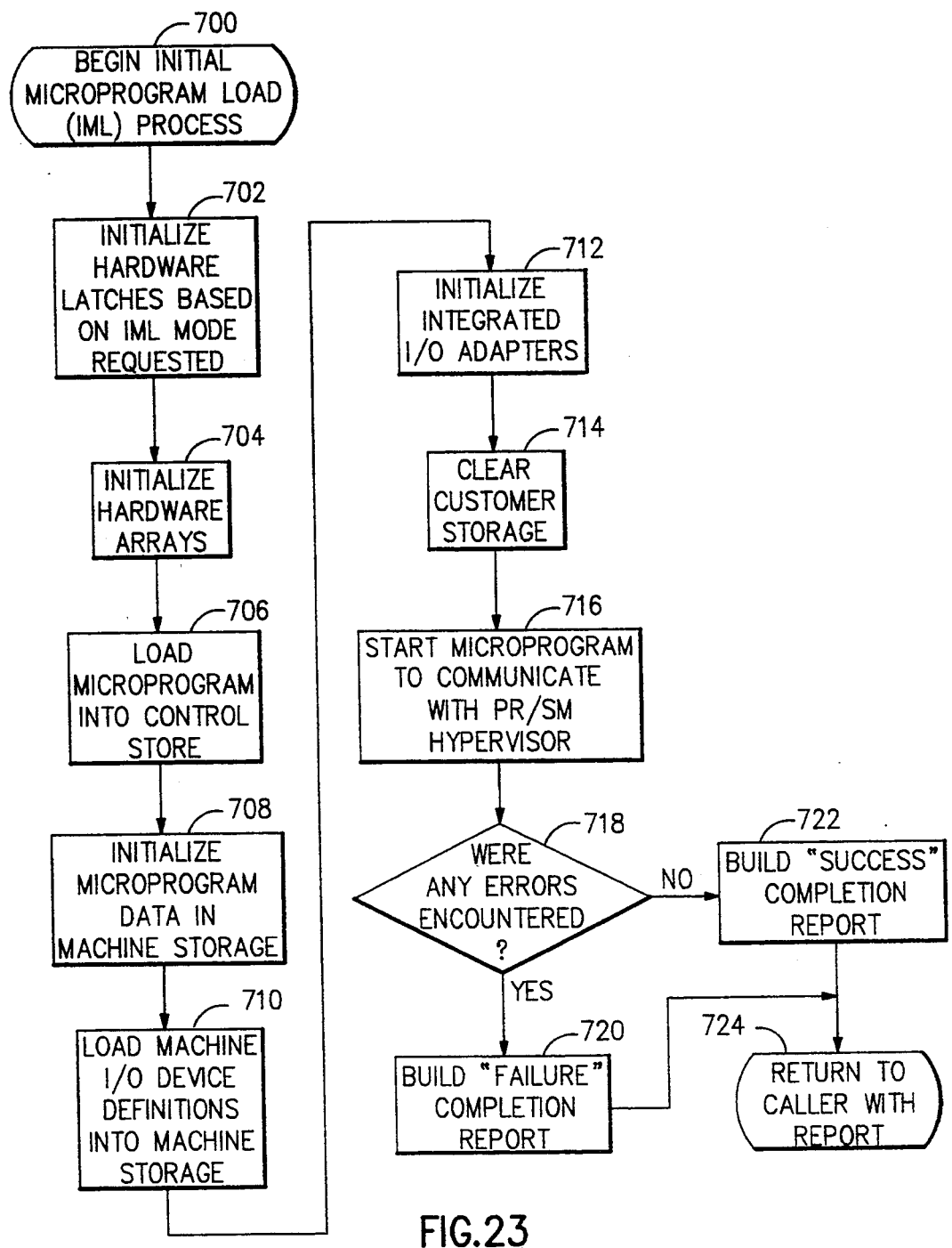
FIG. 23 is a flow chart illustrating an IML process for a logical partition.

Initial microprogram load (IML) process 700 is illustrated in FIG. 23 for a logical partition 702 (FIG. 24) to implement steps 114 and 20 of FIG. 13. Initially, IML process 700 sends a service word to CPU 11 to set hardware latches in CEC 12 to the necessary initial state based on the requested IML mode which in this case is LPAR (step 702). Next, the IML process sends service words to set all hardware arrays to their initial states (step 704). Then a hardware microprogram 261 including a microprogram for PR/SM program 702 is loaded into the machine control storage 263 in CEC 12 (step 706). Then, a hypervisor code 267 is loaded into machine memory 15, and microprogram data areas within microprogram 261 and LPAR hypervisor code 267 in machine storage are set to their initial states (step 708). Then, the definitions for the machine's I/O devices are loaded into machine storage (step 710). Next, all the integrated I/O adapters are initialized (step 712). Next, all the customer storage is initialized (i.e. cleared to zeros) (step 714). Next, the microprogram 261 (that was located in step 704) is started so that it is ready to communicate with the PR/SM hypervisor code (step 716). If any errors were encountered, (decision block 718), then the "Failure" completion report is built (step 720) and returned to the caller (step 724). If, in decision block 718, no errors were encountered, then an "Success" completion report is built (step 722) and returned to the caller (step 724).

Figure 25:
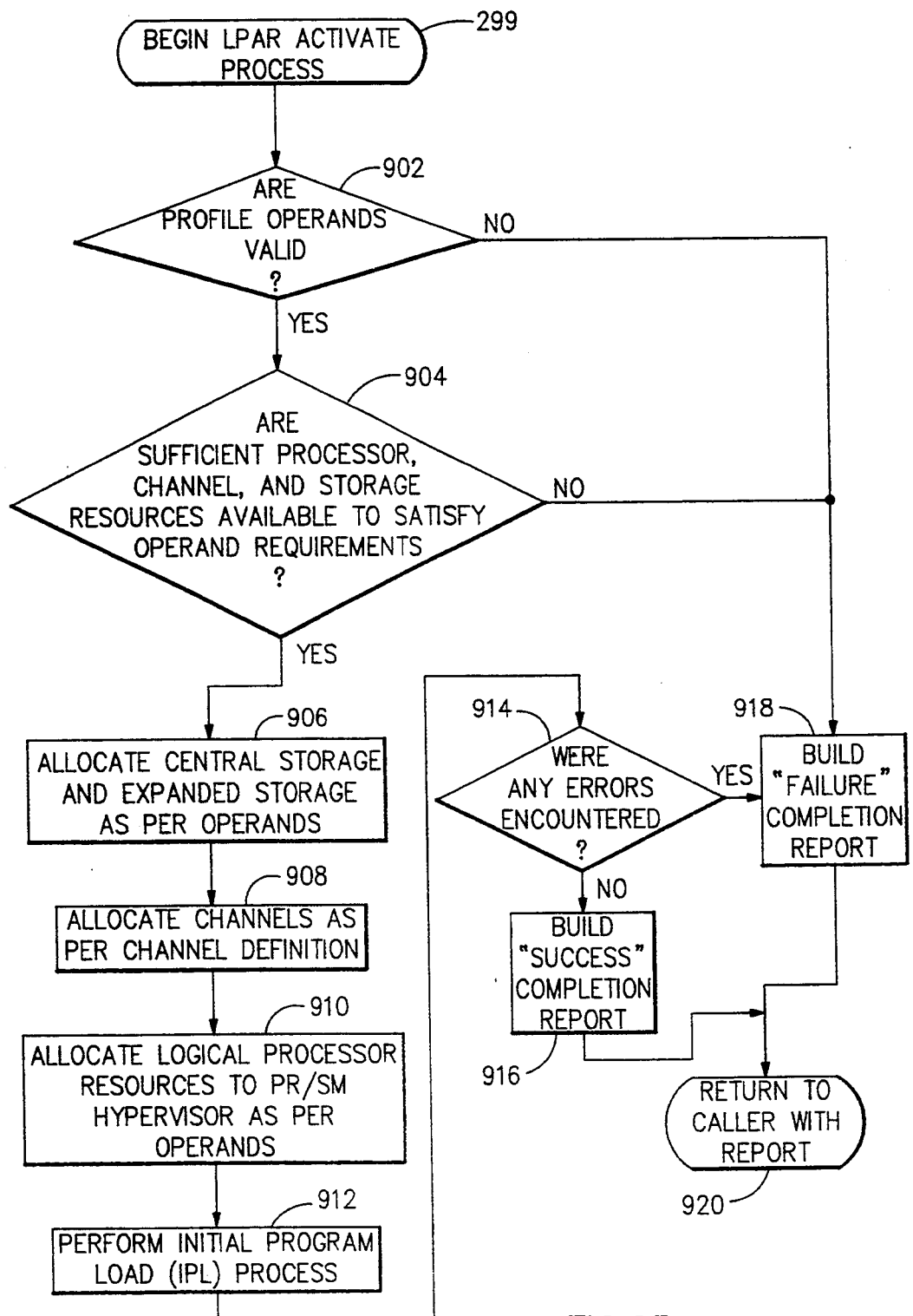
FIG. 25 is a flow chart illustrating activation of a logical partition.

FIG. 25 illustrates the LPAR Activate function 299 (FIG. 18). The first step 902 of the function 299 is to determine if the profile operands are valid i.e. whether they are within the capacity of CEC 12. Next, process 299 determines of sufficient resources (i.e. processors, channels, main and expanded storage) are available (step 904). If not, then process 299 builds a failure completion report (step 920). However, if there are sufficient resources, process 299 then allocates central storage and expanded storage to the logical partition (step 906). Then process 299 allocates specific channels according to the channel definition which was loaded during IML process step 710 (step 908). Next, process 299 allocates processing to the PR/SM hypervisor according to their availability as described above (step 910). Then, process 299 performs IPL process 500 (step 912). If errors are encountered, steps 918 and 920 are implemented as noted above. If no errors are encountered, then process 299 builds a "success completion report" (step 916) ansd returns it to the calling program.

Figure 24:
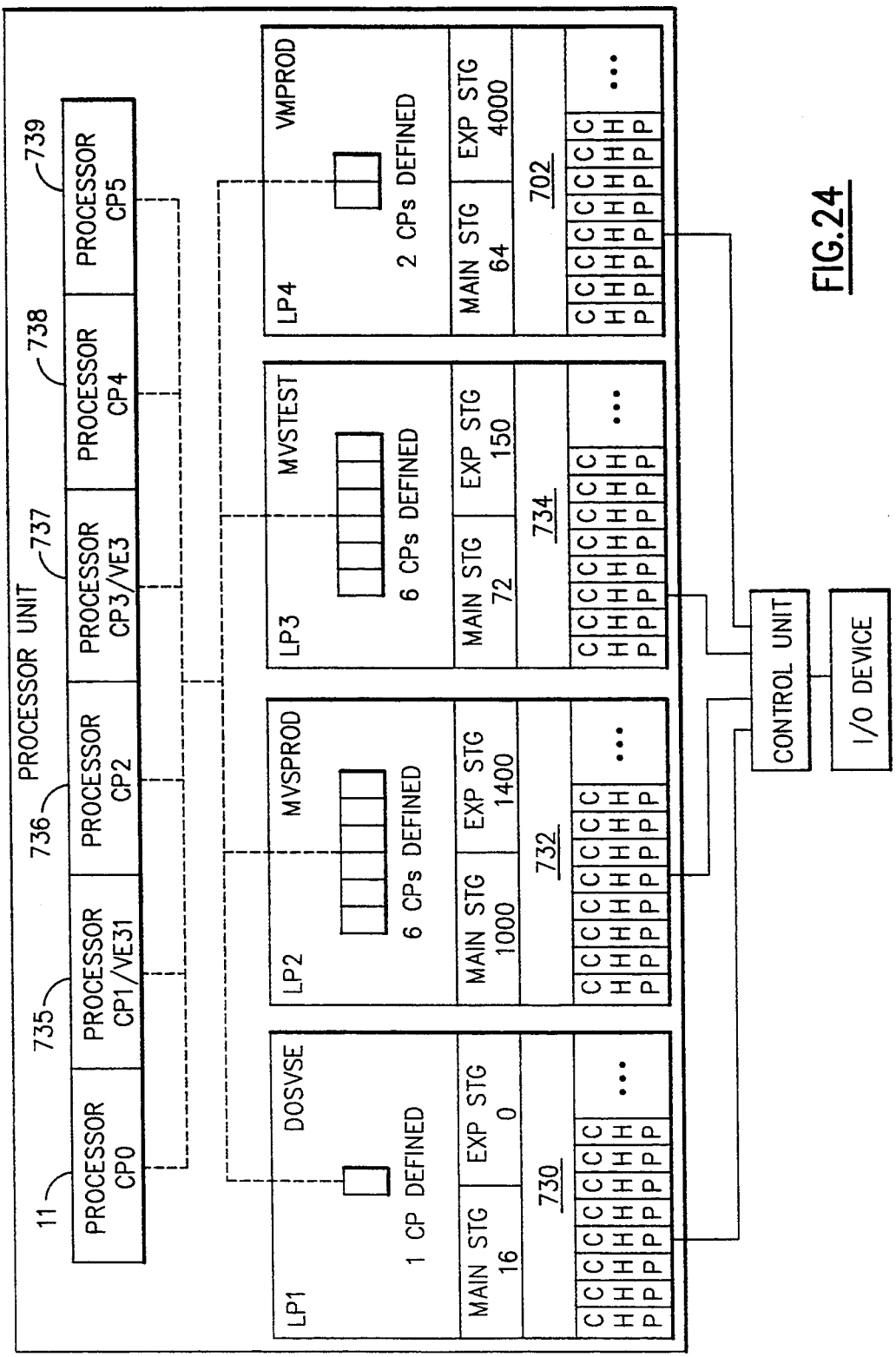
FIG. 24 is a block diagram which schematically illustrates logical partitions.

In PR/SM mode, resources of the CEC 12 are distributed among multiple system control programs. The multiple system control programs can run on CPUs 11, 735-739 simultaneously, and each LPAR has its own set of resources. It should be noted that FIG. 24 introduces processors 735-739 to CEC 12 for purposes of explanation of PR/SM mode; otherwise CEC 12 is the same as described above. The assigned resources for each LPAR are central processors, main storage, channels, and expanded storage. FIG. 24 illustrates a total of four logical partitions (702,730,732 and 734). Logical partition 702 defines two logical central processing units, 64 megabytes of main storage at a specified location, and 498 megabytes of expanded storage at a specified location. It should be noted that the definition of 2 CPU's by logical partition 702 does not specify which of the 6 CPU's are used, rather, the LPAR definition specifies only number of CPU's required, and hypervisor program 267 determines which CPU's are actually utilized by determining which ones are available and dispatching the work of the LPAR to two of the available CPU's for a predetermined length of time, called a time slice. At the end of the time slice, hypervisor program 267 again determines which CPU's are used based on work pending for the other LPAR's and CPU availability. The hypervisor is a control program that coordinates the use of resources i.e. processors, channels and memory defined by the logical partitions and maintains the flow of processing unit operations.

Next, status update microcode 30 updates the status of CEC 12 to reflect the IML of the LPAR microcode 261 including hypervisor code 267. After the PR/SM microcode 261 is loaded, (in step 716, the hypervisor code 267 is also started by PR/SM microcode 261 and LPAR parameters 295 are passed by IML function 400 from LPC 16 to the PR/SM hypervisor program 267. The LPAR parameters 295 stored in LPC 16 define the names of all of the logical partitions, and the channels, memory and expanded storage and the number of processors assigned to each logical partition. However, at this time, only the names and assigned channels of each logical partition are used by the hypervisor microcode 267. In response, hypervisor 267 stores the names and assigned channels of each logical partition in a partition control table 291, and loads a default status of "Not Activated" for each logical partition in partition control table 291. Also in step 716, PR/SM microcode 261 reads the information stored in partition control table 291 that was just stored by hypervisor microcode 267 defining the logical partitions and transmits the information to a partition control table 293 in LPC 16 to mirror the data for use by LPC 16 to have direct access to status information. PR/SM microcode 261 periodically copies the contents of partition control table 291 into partition control table 293 so that LPC 16 regularly has access to current status information. IML function 400 notifies task driver program 232 that the IML of PR/SM microcode 261 including hypervisor microcode 267 has been completed. Then, task driver program 232 requests the status display program 234 for an update of the status of all of the logical partitions defined by LPAR parameters 295. In response, status display program 234 requests the list of logical partitions from SIM 226 and the associated statuses. SIM 226 obtains the list of the logical partitions and the associated statuses from partition control table 293 and returns the information to status display program 234. Then, status display program 234 formats the logical partition names and associated statuses, and passes the formatted information to task driver program 232 which then displays screen 203 illustrated in FIG. 14 which shows the status of real system CEC 12 as "Not Operating" and the statuses of the three logical partitions "MVSPROD", "VMTEST" ANt) "VMPROD" as "Not Activated" (step 204).

Figure 16:
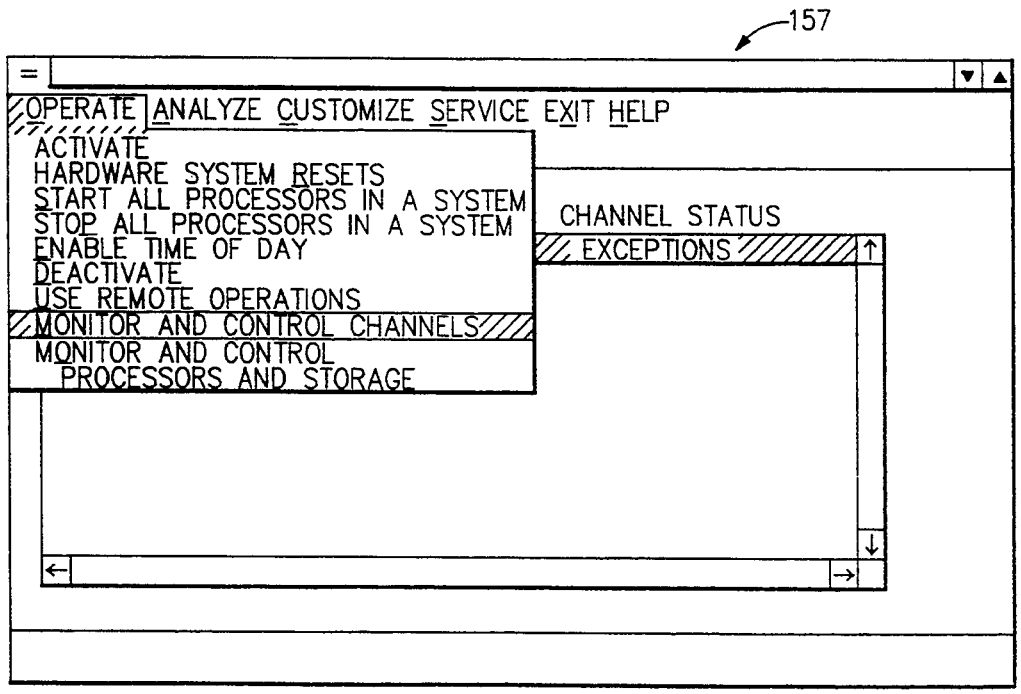

Status update microcode 30 illustrated generally in FIG. 1 and implemented in steps 110, 132 and 168 of FIGS. 2, 8 and 13 comprises channel status monitor program 301, processor unit monitor program 303, SIM 226, processor unit status program 230 and status display program 234 illustrated in FIG. 16. A status update program is used to not only update the status of real and logical objects but to summarize the status of a plurality of similar objects such as to summarize the status of a plurality of channels to conserve space on the display screen yet provide useful information as to the status of each of the members of the class. The processor status update microcode views processor status conditions as falling into three categories:

a) operating, test or loading;
b) stopped, stepping, no power, not operating, or check stopped (error in processor); and
c) status check (no communication between LPC and CEC).

Each of the individual processors within CEC 12 has a status from categories a, b or c, and the status display program implements the following algorithm to summarize the status of the class of processors.

1) If all processors currently have a status from category a, then the summarized status is "Operating".
2) If one or more processors have status from category a and one or more processors have status from category b, then the summarized status is "Exceptions".
3) If all processors have status from category b, but not the same category for all of them, then the summarized status is "Not operating".
4) If all processors have the same status from category b "for example, all have "Stopped" status or "Check Stopped" status), then the summarized status is the status of each (in the above example, "Stopped" status or "Check Stopped" status, respectively).
5) If CEC 12 has not yet been powered on, then the summarized status is "No power".
6) If CEC 12 is powered on but the IML function has not yet been completed, then the summarized status is "Not Operating". As noted above, under these conditions, the summary of the channel status will be blanked out to indicate that channel definition is not yet loaded into memory 15.
7) If IML is complete for CEC 12 but IPL is not complete, then the summarized status "Not Operating". It should be noted that under these conditions, the status of the channel will be "Not Operating" since the channel definition has now been loaded but channels are not processing I/O commands.
8) If local processor console 16 cannot communicate with CEC 12, then the summarized status for the processor will be "Status check".

The following are the categories of status for each of the channels:

a) Operating, Initializing, Test, Log Stored, Bit Errors, or Interface Checks;
b) Stopped, Disabled, Match, Check Stopped, Permanent Error, Loss of Signal, Loss of SYNC, Sequence Time Out, Illegal Sequence, Terminal or Off Line Received.

The following is the algorithm used by status display program 234 to summarize the status of the channels.

1) If local processor console 16 cannot communicate with CEC 12, then the summarized status for the channels remains whatever it was just prior the to loss of LPC-CEC communication. However, the summarized status for the processor will be "Status check".
2) If all channels currently have a status from category a, then the summarized status is "Operating".
3) If one or more channels have status from category a and one or more channels have status from category b, then the summarized status is "Exceptions".
4) If all channels have status from category b but not the same status for all of the channels, then the summarized status is "Not Operating".
5) If all channels have the same status from category b (for example, "Stopped" or "Check Stopped"), then the summarized status is the actual status (in the above example, "Stopped" or "Check Stopped", respectively).
6) If the CEC 12 is not yet powered on, then the channel summary status is blanked out.
7) If the CEC 12 is powered on but the IML function is not yet complete, then the channel summary status is blanked out to indicate that channel definition is not yet loaded into memory 15.
8) If the IML function for CEC 12 is complete, but the IPL function is not complete, then the status summary for the channels is "Not Operating".

To determine the processor status and channel status summarizations for the logical partitions, the summarized status of the channels is based on the above algorithm applied to the channels allocated to each logical partition. The status summarization for the processor(s) allocated to the logical partition is based upon the above processor summarization algorithm applied to the particular processors which are currently allocated to the logical partition by hypervisor program 267. It should be noted that the prior art PR/SM program provides the status of each real component within the logical partition for transmission to partition control table 293. Then the analysis by status display program 30 summarizes status for display on task driver display 40.

Next, LPAR activate function 299 directs activation of logical partition 702 (step 206 of FIG. 13) and logical partition 702 is activated (step 208) in the following manner. The activate function 28 starts the LPAR activate function 299 for the first logical partition 702, and then the LPAR activate function 299 verifies that the logical partition is not activated via a status indication stored in SIM 226. Then, the LPAR activate function 299 verifies that there are at least as many processing units within CEC 12 as specified by the definition of the logical partition 702. In the illustrated example, the logical partition 702 requires two processing units, and CEC 12 includes six processing units so that the verification is successful. LPAR activate function 299 also verifies that there are sufficient main storage, expanded storage and channel resources available to meet the requirements of the logical partition 702, and obtains this information from status information within SIM 226. If there are not sufficient resources available then LPAR activate function 299 returns an error signal to activate program 28 which initiates a message to the user indicating that there are not sufficient resources available. Assuming that there are sufficient resources available, LPAR activate function 299 sends a service word of "Activate_LPAR (name of partition)" to PR/SM hypervisor program 267 within CEC 12. Then, PR/SM hypervisor program 267 allocates the resources previously defined in partition control table 291 i.e. reserves main storage, expanded storage and channel resources according to the LPAR requirements defined in partition control table 291. Also, hypervisor program 267 must allocate processing units to meet the requirements of the logical partition 702, and does so in the following manner. The hypervisor program 267 identifies two of the real processing units which are available to do work for logical partition 702. Hypervisor program 267 can identify the available processors because hypervisor program 267 controls the usage of all the processors, and therefore knows when time slices are available on two of the processors to serve logical partition 702. Then, hypervisor program 267 commands PR/SM microcode 261 to initial program load the two available real processing units. The initial program load for these two real processing units is performed in the same manner as described above for process 500. When the initial program load process is completed, the hypervisor program 267 updates the status of logical partition 702 in the partition control table 291 to show the processor status of "Operating" and the channel status of "Operating". Then, the PR/SM program 261 returns an "IPL Complete" service word to the LPAR activate function 299. In response, LPAR activate function 299 returns a "Successful Completion" return code to activate function 28, and activate function 28 repeats the foregoing steps to direct activation of the remaining logical partitions 730, 732 and 734.

Based on the foregoing, a support computer including a user interface for controlling operation of a data processing computer for a central electronic complex has been disclosed. However, numerous modifications and substitutions can be made without deviating from the scope of the invention. Therefore, the invention has been disclosed by way of illustration and not limitation, and reference should be made to the following claims to determine the scope of the invention.

We claim:

1. A process for operating a data processing computer from a support computer coupled to said data processing computer, said support computer including a video display monitor, said process comprising the steps of:

simultaneously displaying on said monitor a name of said data processing computer and a category of functions which operate said data processing computer;

selecting the operate category, and in response, displaying a pull down menu of a plurality of functions which operate said data processing computer, said plurality of functions which operate said data processing computer including a function or functions to power on said data processing computer, load an initialization program for said data processing computer in a system mode, and load an initialization program for each of a plurality of respective logical partitions of said data processing computer in a logical partition mode;

selecting the power on and loading function; and during one mode of operation, selecting said system mode, and in response, displaying a name and status of said data processing computer, powering on said data processing computer and updating the displayed status of said data processing computer, and then loading said initialization program for said system mode and updating the displayed status of said data processing computer; and during another mode of operation, selecting said logical partition mode, and in response, simultaneously displaying a name of said data processing computer, names of said plurality of logical partitions of said data processing computer, status of said data processing computer and status of each of said logical partitions, powering on said data processing computer and updating the displayed status of said data processing computer, and then loading the respective initialization program for each of said logical partitions and updating the displayed status of each of said logical partitions, and then updating the displayed status of said data processing computer.

2. A process as set forth in claim 1 wherein the step of displaying said name of said system mode and said name of said logical partition mode occurs after the step of selecting the power on and loading function.

3. A process as set forth in claim 1 wherein said initialization programs for said logical partitions are loaded sequentially, and the displayed status of each of the logical partitions is updated sequentially after said each logical partition is loaded with the respective initialization program.

4. A support computer for operating a data processing computer coupled to said support computer, said support computer comprising:

a video display monitor and means for making selections from said monitor;

means for controlling said monitor to simultaneously display a name of said data processing computer and a category of functions which operate said data processing computer;

means, responsive to selection of said operate category, for controlling said monitor to display a pull down menu of a plurality of functions which operate said data processing computer, said plurality of functions which operate said data processing computer including a function or functions to power on said data processing computer and load an initialization program for said data processing computer in a system mode or load an initialization program for each of a plurality of respective logical partitions of said data processing computer in a logical partition mode;

means, responsive to selection of said power on and loading function, for controlling said monitor to display a name of said system mode and a name of said logical partition mode;

first means, responsive to selection of said system mode, for controlling said monitor to display a name and status of said data processing computer, powering on said data processing computer and controlling said monitor to update the displayed status of said data processing computer, and then loading said initialization program for said system mode and controlling said monitor to update the displayed status of said data processing computer;

second means, responsive to selection of said logical partition mode, for controlling said monitor to simultaneously display a name of said data processing computer, names of a plurality of logical partitions of said data processing computer, status of said data processing computer and status of each of said logical partitions, and then powering on said data processing computer and controlling said monitor to update the displayed status of said data processing computer, and then loading the respective initialization program for each of said logical partitions and controlling said monitor to update the displayed status of each of said logical partition.

5. A support computer as set forth in claim 4 wherein said second means loads the initialization programs for all of said logical partitions sequentially and further comprising means for controlling said monitor to update the displayed status of said data processing computer after each of the logical partitions is loaded with the respective initialization program.

6. A support computer as set forth in claim 4 further comprising means for storing a profile of said data processing computer in said system mode which profile lists a location of and amount of memory required by the respective initialization program, and a profile for each of said logical partitions which profile indicates a location of and amount of memory required by the respective initialization program for said each logical partition during said logical partition mode; and wherein said first means reads the profile for said system mode before loading the initialization program for said system mode and said second means reads the profile for each of said logical partitions before loading the initialization program for the logical partition in the logical partition mode.

7. A support computer as set forth in claim 4 wherein said operate category includes a function to start or stop processors within said data processing computer.

8. A process for operating a data processing computer, said process comprising the steps of:

displaying on a video display monitor a category of functions to operate said data processing computer;

selecting the operate category, and in response, displaying a pull down menu of a plurality of functions which operate said data processing computer, said plurality of functions which operate said data processing computer including a function or functions to power on said data processing computer and load an initialization program for each of a plurality of respective logical partitions of said data processing computer;

selecting the power on and load function or functions; and simultaneously displaying a name of said data processing computer, names of said plurality of logical partitions of said data processing computer, status of said data processing computer and status of each of said logical partitions, and then powering on said data processing computer and updating the displayed status of said data processing computer, and then loading the respective initialization program for each of said logical partitions and updating the displayed status of each of said logical partitions, and then updating the displayed status of said data processing computer.

9. A support computer for powering on a data processing computer coupled to said support computer and loading initialization programs for said data processing computer, said support computer comprising:

a video display monitor and means for making selections from said video display monitor;

means for controlling said monitor to display a category of functions which operate said data processing computer;

means, responsive to selection of said operate category, for controlling said monitor to display a pull down menu of a plurality of functions which operate said data processing computer, said plurality of functions which operate said data processing computer including a function or functions to power on said data processing computer and load an initialization program each of a plurality of respective logical partitions of said data processing computer;

means, responsive to selection of said power on and load function or functions, for controlling said monitor to simultaneously display a name of said data processing computer, names of a plurality of logical partitions of said data processing computer, status of said data processing computer and status of each of said logical partitions, and then powering on said data processing computer and controlling said monitor to update the displayed status of said data processing computer, and then loading the respective initialization program for each of said logical partitions and controlling said monitor to update the displayed status of each of said logical partition.

10. A process for operating a data processing computer, said process comprising the steps of:

displaying on a video display monitor a category of functions which operate said data processing computer;

selecting the operate category, and in response, displaying a pull down menu of a plurality of functions which operate said data processing computer, said plurality of functions which operate said data processing computer including a function to power on said data processing computer, load initialization microcodes and load an initialization program for each of a plurality of respective logical partitions of said data processing computer;

selecting the power on and load function; and simultaneously displaying a name of said data processing computer, names of said plurality of logical partitions of said data processing computer, status of said data processing computer and status of each of said logical partitions, and then powering on said data processing computer and updating the displayed status of said data processing computer, and then loading the respective initialization microcode and initialization program for each of said logical partitions and updating the displayed status of each of said logical partitions.

11. A support computer for powering on a data processing computer coupled to said support computer and loading initialization microcodes and initialization programs for said data processing computer, said support computer comprising:
- a video display monitor;
- means for making selections from said video display monitor;
- means for controlling said monitor to display a category of functions which operate said data processing computer;
- means, responsive to selection of said operate category, for controlling said monitor to display a pull down menu of a plurality of functions which operate said data processing computer, said plurality of functions which operate said data processing computer including a function to power on said data processing computer and load an initialization microcode and initialization program for each of a plurality of respective logical partitions of said data processing computer; and
- means, responsive to selection of said power on and load function, for controlling said monitor to simultaneously display a name of said data processing computer, names of a plurality of logical partitions of said data processing computer, status of said data processing computer and status of each of said logical partitions, and then powering on said data processing computer and controlling said monitor to update the displayed status of said data processing computer, and then loading the respective initialization microcode and initialization program for each of said logical partitions and controlling said monitor to update the displayed status of each of said logical partitions, and then controlling said monitor to update the displayed status of said data processing computer.

12. A process for operating a data processing computer, said process comprising the steps of:
- simultaneously displaying a name of said data processing computer, names of a plurality of logical partitions of said data processing computer, status of said data processing computer and status of each of said logical partitions, and then powering on said data processing computer and updating the displayed status of said data processing computer, and then loading a respective initialization program for each of said logical partitions and updating the displayed status of each of said logical partitions, and then updating the displayed status of said data processing computer.

13. A process as set forth in claim 12 wherein said initialization programs for said logical partitions are loaded sequentially, and the displayed status of each of the logical partitions is updated sequentially after said each logical partition is loaded with the respective initialization program.

14. A support computer for operating a data processing computer coupled to said support computer, said support computer comprising:
- means for simultaneously displaying a name of said data processing computer, names of a plurality of logical partitions of said data processing computer, status of said data processing computer and status of each of said logical partitions;
- means for subsequently powering on said data processing computer and updating the displayed status of said data processing computer;
- means for subsequently loading a respective initialization program for each of said logical partitions and updating the displayed status of each of said logical partitions; and means for subsequently updating the displayed status of said data processing computer.

15. A support computer as set forth in claim 14 wherein the initialization program loading means loads the initialization programs for all of said logical partitions sequentially and further comprising means for updating the displayed status of each of the logical partitions sequentially after said each logical partition is loaded with the respective initialization program.

* * * * *